United States Patent
Bush et al.

(10) Patent No.: US 12,247,866 B1
(45) Date of Patent: Mar. 11, 2025

(54) SENSOR DEPLOYMENT FOR DISTRIBUTED ACOUSTIC SENSING WITH NOISE CANCELLATION USING A REFERENCE COIL

(71) Applicant: Halliburton Energy Services, Inc., Houston, TX (US)

(72) Inventors: Ira Bush, Van Nuys, CA (US); Mikko K. Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/532,956

(22) Filed: Dec. 7, 2023

(51) Int. Cl.
  *G01H 9/00* (2006.01)
  *E21B 47/135* (2012.01)
  *G10K 11/178* (2006.01)

(52) U.S. Cl.
  CPC .......... *G01H 9/004* (2013.01); *E21B 47/135* (2020.05); *G10K 11/17854* (2018.01)

(58) Field of Classification Search
  CPC ........ G01H 9/004; G01H 3/04; E21B 47/135; E21B 47/107; E21B 49/00; E21B 47/14; G01V 1/226; G01V 1/42; G01V 2210/1429
  See application file for complete search history.

(56) References Cited

U.S. PATENT DOCUMENTS

| | | | |
|---|---|---|---|
| 7,743,661 B2 | 6/2010 | Berthold et al. | |
| 10,309,825 B2 | 6/2019 | Suh et al. | |
| 10,337,316 B2 | 7/2019 | Jaaskelainen et al. | |
| 10,961,844 B2 | 3/2021 | Jaaskelainen et al. | |
| 11,047,230 B2 | 6/2021 | Ellmauthaler et al. | |
| 11,111,780 B2 | 9/2021 | Barfoot et al. | |
| 11,326,936 B2 | 5/2022 | Ellmauthaler et al. | |
| 11,396,808 B2 | 7/2022 | Jaaskelainen et al. | |
| 11,493,380 B2 | 11/2022 | Stark et al. | |
| 11,549,369 B1 | 1/2023 | LeBlanc et al. | |
| 11,578,547 B2 | 2/2023 | Jaaskelainen et al. | |
| 11,634,973 B2 | 4/2023 | Park et al. | |
| 11,719,080 B2 | 8/2023 | Bland et al. | |
| 11,732,578 B2 | 8/2023 | Ellmauthaler et al. | |

(Continued)

OTHER PUBLICATIONS

English Translation of EA 038373. (Year: 2021).*

(Continued)

*Primary Examiner* — Zakiya W Bates
(74) *Attorney, Agent, or Firm* — John Wustenberg; C. Tumey Law Group PLLC

(57) ABSTRACT

A distributed acoustic system (DAS) may include at least one laser that transmits a continuous wave (CW) light, a pulser optically connected to the at least one laser to receive the CW light from the at least one laser and form a light pulse, and a splitter optically connected to the pulser to optically split the light pulse into a plurality of light pulses. The DAS may further comprise a circulator optically connected to an output of the splitter, a sensor fiber attached to the circulator, and a reference coil disposed on the sensor fiber between the circulator and a first section. A method for using the DAS may include transmitting one or more light pulses from a laser into the DAS, generating an interrogator specific noise profile for the reference wellbore, and generating an application specific noise profile for a first sensor fiber disposed in the reference wellbore.

10 Claims, 15 Drawing Sheets

(56) References Cited

U.S. PATENT DOCUMENTS

| | | |
|---|---|---|
| 11,746,627 B1 | 9/2023 | Jaaskelainen |
| 2013/0025375 A1 | 1/2013 | Goldner et al. |
| 2018/0143041 A1 | 5/2018 | Johnston |
| 2020/0102821 A1* | 4/2020 | Willis .................... G01V 1/37 |
| 2020/0362692 A1 | 11/2020 | Ellmauthaler et al. |
| 2021/0096020 A1 | 4/2021 | Stark et al. |
| 2021/0156734 A1 | 5/2021 | Johnston et al. |
| 2021/0270131 A1 | 9/2021 | Ellmauthaler et al. |
| 2021/0364669 A1 | 11/2021 | Dusterhoft et al. |
| 2022/0186612 A1 | 6/2022 | Maida, Jr. et al. |
| 2022/0214468 A1 | 7/2022 | Ellmauthaler et al. |
| 2022/0403734 A1 | 12/2022 | Jaaskelainen et al. |
| 2022/0412821 A1 | 12/2022 | Jaaskelainen et al. |
| 2023/0243989 A1 | 8/2023 | Suh et al. |
| 2023/0332499 A1 | 10/2023 | Ellmauthaler et al. |
| 2023/0344544 A1 | 10/2023 | Wilson et al. |
| 2024/0133753 A1* | 4/2024 | Suh ....................... G01H 9/004 |

OTHER PUBLICATIONS

International Search Report and Written Opinion for International Patent Application No. PCT/US2023/086260 dated Aug. 30, 2024. PDF file. 7 pages.

\* cited by examiner

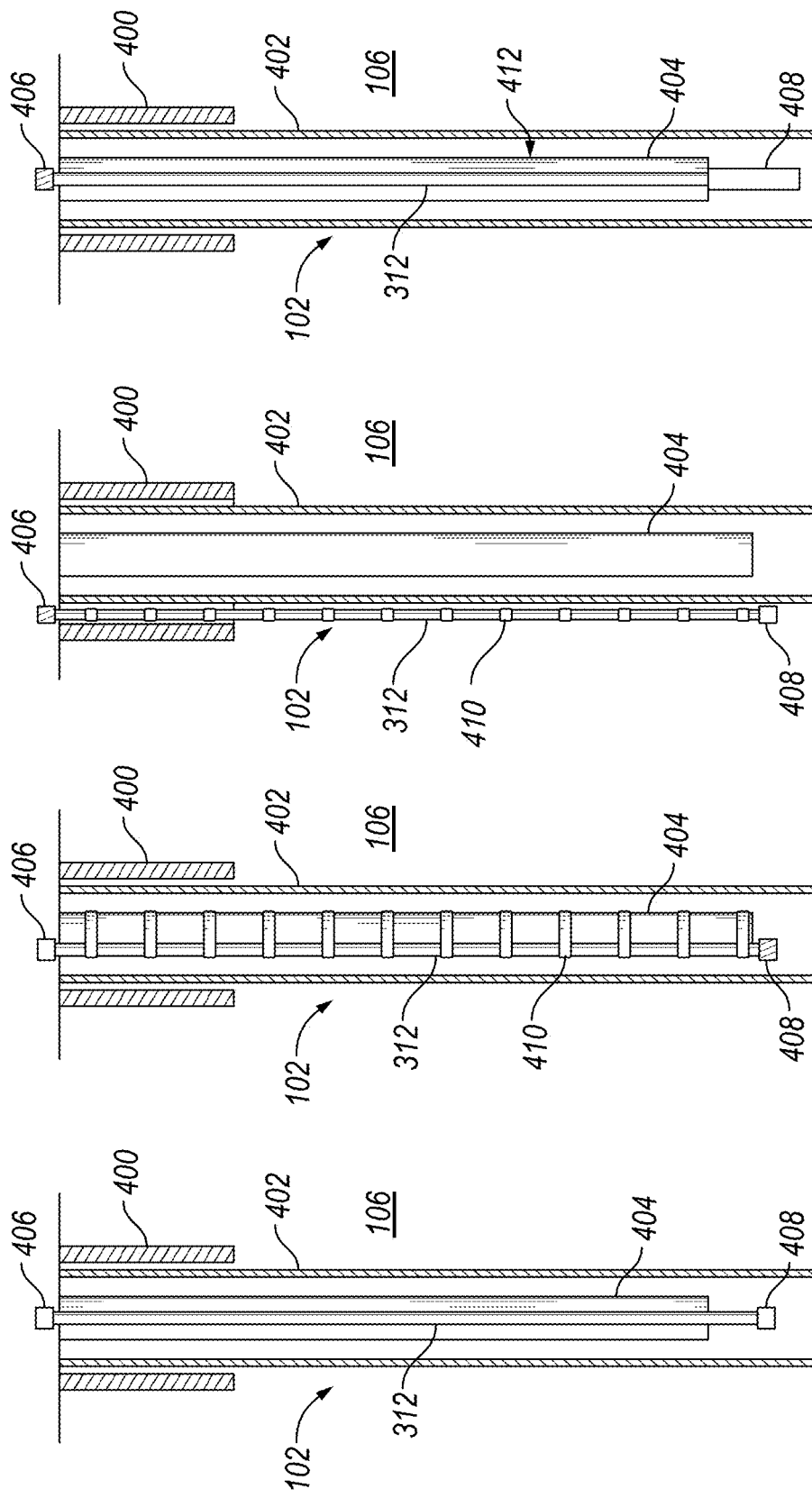

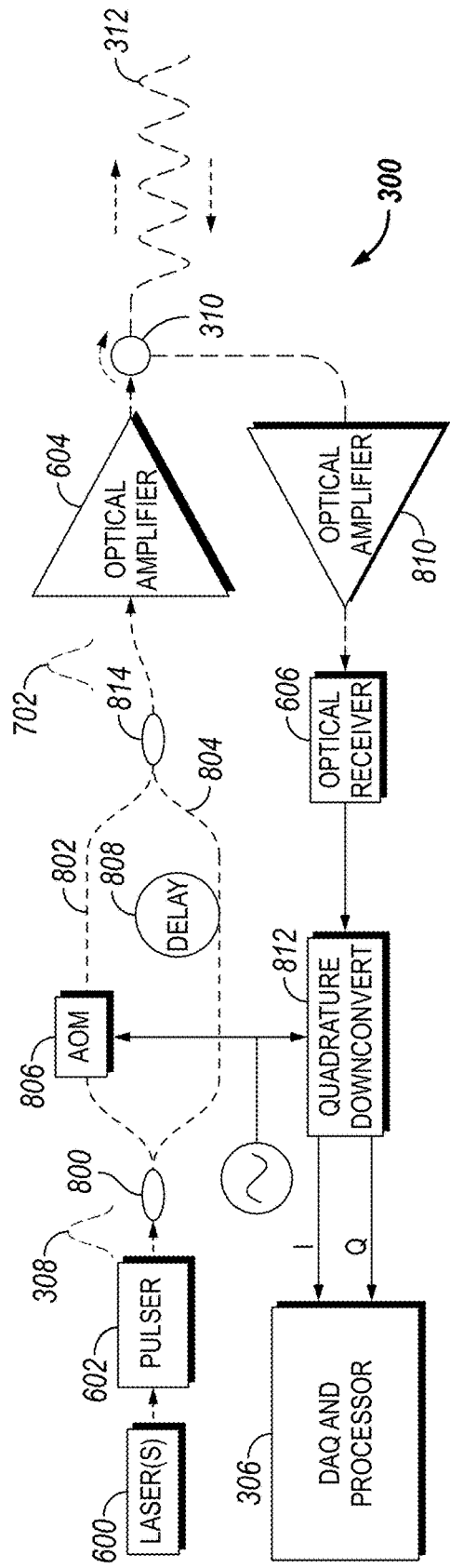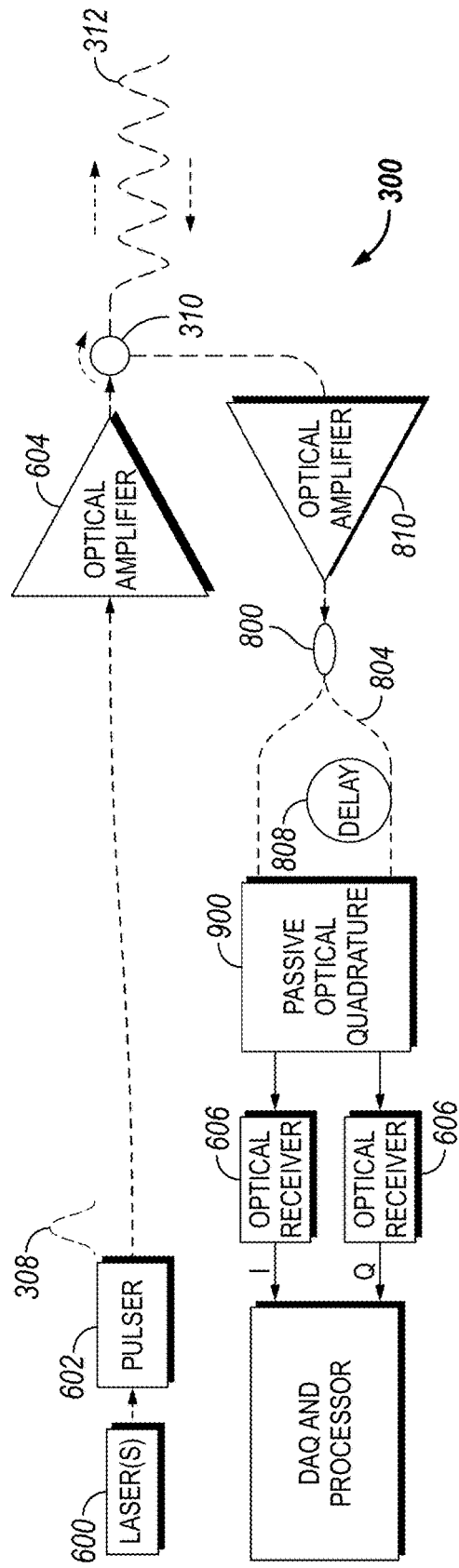

SENSOR DEPLOYMENT FOR DISTRIBUTED ACOUSTIC SENSING WITH NOISE CANCELLATION USING A REFERENCE COIL

BACKGROUND

Boreholes drilled into subterranean formations may enable recovery of desirable fluids (e.g., hydrocarbons) using a number of different techniques. A number of systems and techniques may be employed in subterranean operations to determine borehole and/or formation properties. For example, Distributed Acoustic Sensing (DAS) along with a fiber optic system may be utilized together to determine borehole and/or formation properties. Distributed fiber optic sensing may obtain real-time, high-resolution, highly accurate temperature and strain (acoustic) data along the entire wellbore. In examples, discrete sensors, e.g., for sensing pressure and temperature, may be deployed in conjunction with the optical fiber. Additionally, distributed fiber optic sensing may eliminate downhole electronic complexity by shifting all electro-optical complexity to the surface within the interrogator unit. Optical fibers may be permanently deployed in a wellbore via single- or dual-trip completion strings, behind casing, on tubing, or in pumped down installations: or temporally via coiled tubing, slickline, or disposable cables.

The field of Distributed Acoustic Sensing (DAS) has rapidly evolved from "high science" fascinations to multi-market distributed sensing panacea. Initial roots formed as military defense focused applications, simmering for perhaps two decades as restricted "classified" projects.

Once those restrictions were relaxed (circa 2000), the interests and scope broadened to commercial interest/endeavors including intrusion detection, downhole oil and gas sensing, pipeline monitoring, third party intrusion detection, power distribution monitoring, geophysical seismic detection and others. Moving forward to current day, many new applications have surfaced to address the numerous agendas for Smart Cities, land subsidence, Homeland Security, infrastructure, where the DAS technology has become more sophisticated and addresses sensing applications well beyond tripwire capability, where now the sensor fidelity and linearity performance is more likened to a giant string of microphones or seismometers.

A typical DAS system comprises an interrogator which couples to a fiber to comprise the sensor. Current commercial pricing for interrogators ranges from $50,000 (the simple low fidelity type) up to $250,000 (high performance type). Although these systems are quite capable of covering the aforementioned applications, their costs well outrange most of the markets they could address. This is principally due to the current design architecture used for DAS Interrogators. It is not well suited for scale-up cost reductions.

BRIEF DESCRIPTION OF THE DRAWINGS

For a detailed description of the preferred examples of the disclosure, reference will now be made to the accompanying drawings in which:

FIGS. 4A-4D illustrate examples of a downhole fiber deployed in a wellbore;
FIGS. 6-13 illustrate other examples of the DAS.

DETAILED DESCRIPTION

The present disclosure relates generally to a system and method for component sharing by implementing a single enhanced launched system to feed a large plurality of receive systems. All distributed acoustic sensing (DAS) interrogators utilized two opto-electronic systems. First, a launch system which appropriately prepares the light to propagate forward into the sensor fiber. Second, a receiver system which receives the backscattered light from the sensor fiber which appropriately processes that light and photoconverts it to an electronic signal. Optimal sharing may be realized when as many of the components as possible are placed in the launch system and output optical launch power is increased which fans out to a large plurality of sensors.

Discussed below are systems and methods for various measurements in a zone of interest where measurement applications may include one or more of low frequency strain measurements, microseismic measurement, flow measurements, leak detection measurements, Vertical Seismic Profiling (VSP) measurements, seismic survey measurements, and/or the like. Many of these measurements may have different signal attributes in terms or signal frequencies and amplitudes. This may make noise cancellation specific to a selected measurement application. For example, a low frequency strain measurement noise cancellation algorithm may be optimized for data below 10 Hz or in some instances below 1 Hz or even below 0.1 Hz, microseismic data would normally reside in the 10 Hz to 500 Hz and more particularly between 30 Hz to 100 Hz, whereas a VSP survey may be optimized between 6 Hz to 150 Hz or more likely coordinated with the vibrational source frequency content of e.g. 10-100 Hz in many instances.

Additionally, the methods and systems discussed below may utilize one interrogator to simultaneously measure broadband data for multiple applications simultaneously and the signal processing path may be different for the different applications and likewise the noise cancellation algorithm used may be tailored to each different application. The time constant for a low frequency strain application targeting data below 1 Hz would be significantly different from a microseismic survey targeting data up to 500 Hz.

Various adaptive and active noise control algorithms may be used, and the algorithms may also be trained on historical data where data sets may have been collected in various basing and/or various surface system configurations and environments. The noise control algorithms may use data from the environmentally isolated reference fiber for real-time noise cancellation, for example, the output from the noise cancellation algorithm may need to achieve similar noise levels on the lead-in and surface fibers as may be measured on the environmentally isolated reference fiber. A third system may be used to record dominant noise sources that may be used to further refine noise reduction algorithms.

Figure 1:
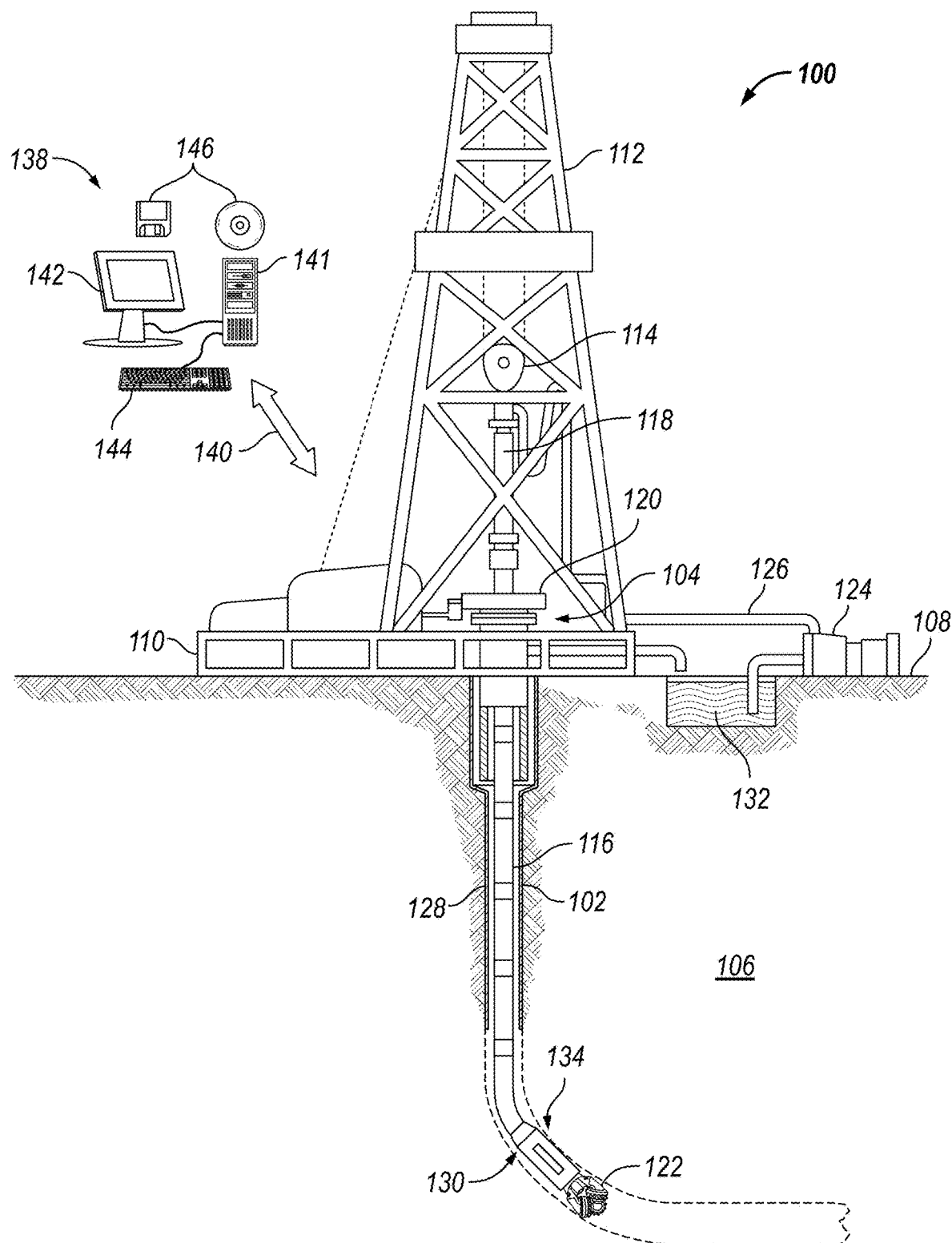
FIG. 1 illustrates an example of a drilling operation.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel casing disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may comprise roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while drilling (MWD) or logging-while-drilling (LWD) system.

BHA 130 may comprise any number of tools, transmitters, and/or receivers to perform downhole measurement operations. For example, as illustrated in FIG. 1, BHA 130 may include a measurement assembly 134. It should be noted that measurement assembly 134 may make up at least a part of BHA 130. Without limitation, any number of different measurement assemblies, communication assemblies, battery assemblies, and/or the like may form BHA 130 with measurement assembly 134. Additionally, measurement assembly 134 may form BHA 130 itself.

Without limitation, BHA 130 and all parts within BHA 130 may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, which may be used to process the measurements of BHA 130 before they may be transmitted to surface 108. Alternatively, raw measurements from BHA 130 may be transmitted to surface 108.

Any suitable technique for communication link 140 may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface. At surface, pressure sensors (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138. Information handling system 138 may analyze and process data based at least in part on different systems that work together to form information handling system 138. Information handling system 138 may comprise a personal computer 141, a video display 142, a keyboard 144 (i.e., other input devices), and/or non-transitory computer-readable media 146 (e.g., optical disks, magnetic disks) that can store code representative of the methods described herein.

Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Information handling system 138 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 138 may be utilized to control drilling system 100 to form a completed well that may be at least partially vertical and/or at least partially horizontal.

Figure 2:
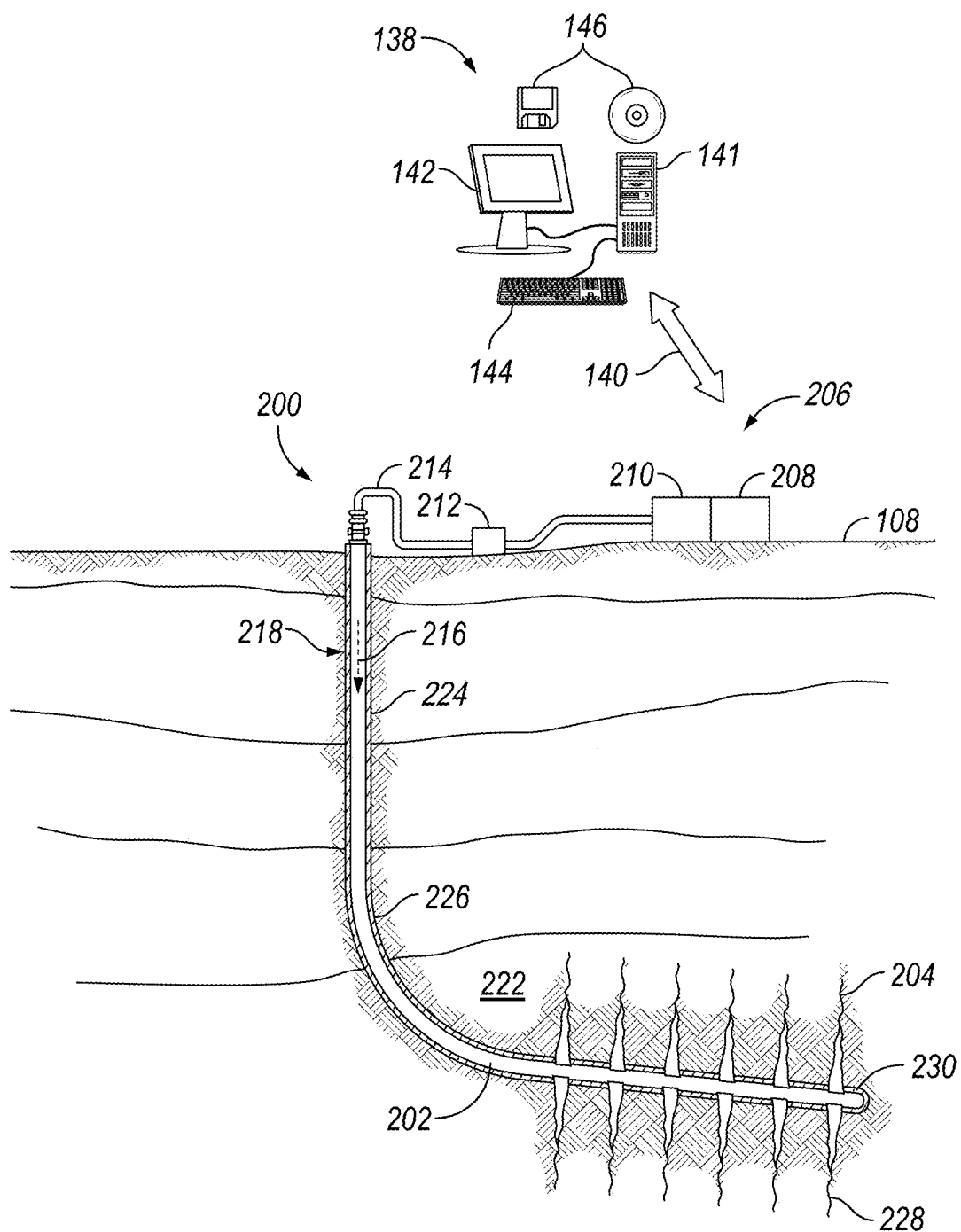
FIG. 2 illustrates an example of a fracking operation.

FIG. 2 illustrates an example of a fracturing operation 200 within a completed well system. During fracturing operation 200, proppant 202 may be inserted into fractures 204. By way of example, fracturing operation 200 may be simulated in a hydraulic fracturing simulator using information handling system 138. Fracturing operation 200 may include a fluid handling system 206, which may include fluid supply 208, mixing equipment 210, pumping equipment 212, and wellbore supply conduit 214. Pumping equipment 212 may be fluidly coupled with the fluid supply 208 and wellbore supply conduit 214 to communicate a fracturing fluid 216, which may comprise proppant 202 into wellbore 218. Fluid supply 208 and pumping equipment 212 may be above surface 108 while the wellbore 218 is below surface 108.

Fracturing operation 200 may also be used for the injection of a pad or pre-pad fluid into the subterranean formation at an injection rate at or above the fracture gradient to create at least one fracture 204 in subterranean formation 222. Fracturing operation 200 may then inject the fracturing fluid 216 into subterranean formation 222 surrounding wellbore 218. Generally, a wellbore 218 may include horizontal, vertical, slanted, curved, and other types of wellbore geometries and orientations, and proppant 202 may generally be applied to subterranean formation 222 surrounding any portion of wellbore 218, including fractures 204. Wellbore 218 may include casing 224 that may be cemented (or otherwise secured) to the wall of wellbore 218 by cement sheath 226. Perforations 228 may allow communication between wellbore 218 and subterranean formation 222. As illustrated, perforations 228 may penetrate casing 224 and cement sheath 226 allowing communication between interior of casing 224 and fractures 204. A plug 230, which may be any type of plug for oilfield applications (e.g., bridge plug), may be disposed in wellbore 218 below perforations 228.

In accordance with systems and/or methods of the present disclosure, a perforated interval of interest (depth interval of wellbore 218 including perforations 228) may be isolated with plug 230. A pad or pre-pad fluid may be injected into subterranean formation 222 at an injection rate at or above the fracture gradient to create at least one fracture 204 in subterranean formation 222. Then, proppant 202 may be mixed with an aqueous based fluid via mixing equipment 210, thereby forming a fracturing fluid 216, and then may be pumped via pumping equipment 212 from fluid supply 208 down the interior of casing 224 and into subterranean formation 222 at or above a fracture gradient of the subterranean formation 222. Pumping fracturing fluid 216 at or above the fracture gradient of the subsurface formation 222 may create (or enhance) at least one fracture (e.g., fractures 204) extending from perforations 228 into the subterranean formation 222. Alternatively, fracturing fluid 216 may be pumped down production tubing, coiled tubing, or a combination of coiled tubing and annulus between the coiled tubing and casing 224.

At least a portion of fracturing fluid 216 may enter fractures 204 of subterranean formation 222 surrounding wellbore 218 by way of perforations 228. Perforations 228 may extend from the interior of casing 224, through cement sheath 226, and into subterranean formation 222.

Many reservoirs may have existing wells in the same or neighboring reservoir layers where pressure may be locally reduced due to production, and all reservoirs are inhomogeneous to various degrees. Future wells may be placed in areas where reservoir characteristics are more complex as many sweet spots with good reservoir conditions may already be drilled.

It is therefore desirable to monitor fracturing operations using low frequency strain monitoring in order to verify that the generated fractures are being placed per the plan given the various uncertainties. One practical and cost-effective technology for fracture monitoring is based on Distributed Acoustic Sensing (DAS) with the optical sensing fiber in monitoring wells. It should be noted that the DAS system connects optical devices, described below, by single mode fibers, multimode fibers, and/or enhanced fibers.

Barriers to large scale implementation include cost, complexity, and lack of automation. The methods and systems described below with massive DAS designs reduce cost and complexity, in particular when you apply it to a modular approach. In a modular approach the DAS system may have a stand-alone system with automation, small enclosure that can be loaded on a truck bed, small low noise AC, vibration isolation and satellite connection for data communication. The current approach may further reduce the thermal footprint as less components for each optical sensing fiber, and also increase reliability as the system component count goes down per channel when compared with conventional approaches. The thermal, mechanical, and acoustic noise contribution of a system is an improvement over conventional approaches. It will be more thermally stable as the system is fully enclosed whereas the current practice is to keep the system in a trailer where personnel open doors and move in/out of the trailer. The system will also have less mechanical vibration as there are no personnel walking around and you will have no slamming doors. Likewise, the system will be more acoustically isolated from conversations, slamming doors and isolation barriers.

The methods and systems described below may be used for various measurements in the zone of interest where measurement applications may include one or more of low frequency strain measurements, microseismic measurement, production flow measurements, leak detection measurements, Vertical Seismic Profiling (VSP) measurements, seismic survey measurements etc., and many of these measurements have different signal attributes in terms or signal frequencies and amplitudes. Characteristic may differ between different measurement application e.g. a low frequency strain measurement algorithm may be optimized for data below e.g. 10 Hz or in some instances below 1 Hz or even below 0.1 Hz, microseismic data would normally reside in the 10 Hz to 500 Hz and more particularly between 30 Hz to 100 Hz, whereas a VSP survey may be optimized between 6 Hz to 150 Hz or more likely coordinated with the vibrational source frequency content of e.g. 10-100 Hz in many instances. One interrogator may be used to simultaneously measure broadband data for multiple applications simultaneously and the signal processing path may be different for the different applications and likewise the noise cancellation algorithm used may be tailored to each different application. The time constant for a low frequency strain application targeting data below 1 Hz would be significantly different from a microseismic survey targeting data up to 500 Hz. Thus, DAS systems and methods may be utilized for production monitoring, specifically as subsurface flow meters using fiber wrapped around surface flow pipes and then used for surface flow metering. Other measurements may comprise subsurface ICV/AICD injection/production monitoring. where flow models may be built for downhole monitoring where fluids pass through orifices of known size. Additionally, surface flow lines and pipelines may be monitored for flow assurance, flow regime, slugs (gas, sand) and thereby prepare processing facilities.

Figure 3:
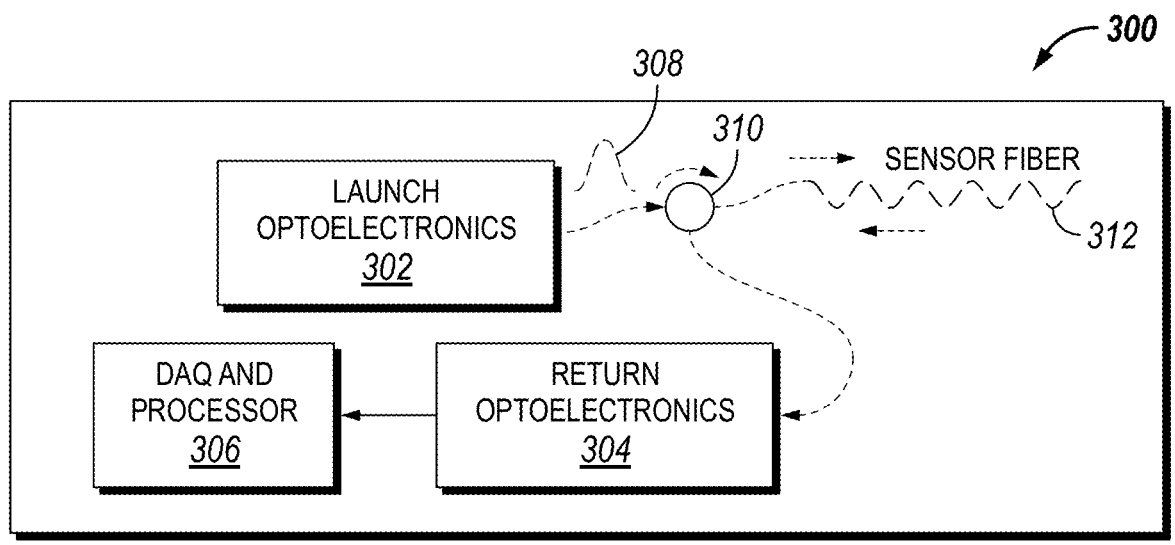
FIG. 3 illustrates an example of a distributed acoustic system (DAS)

FIG. 3 illustrates a schematic example of architecture for DAS 300 that may be utilized for macro systems. As illustrated, DAS 300 may comprise launch optoelectronics 302, return optoelectronics 304, and acquisition and processor 306. During operations, one or more light pulses 308 may be transmitted from launch optoelectronics 302. Launch optoelectronics 302 may comprise "interrogation" elements that "launch" the light into sensor fiber 312. Generally, launch optoelectronics 302 may comprise one or more lasers. In examples, if a design of DAS 300 utilizes multiple wavelengths, then one or more Wavelength Division Multiplexers (WDMs) may be used to combine all the wavelengths onto one optical fiber. For this disclosure, optical fibers may comprise single mode telecommunication fibers fabricated to ITU standards G.652 and G.657. Also, other custom single mode fibers are used which extend operational temperature ranges or enhance/increase distributed backscatter coefficients. Further, a variety of multimode fibers are used, where typically these are pre-installed and initially used for other applications. For example, "enhanced backscatter fibers" may be utilized in DAS 300. Where sensor fibers 312 may be traditional Single mode fiber with backscatter characteristics compatible with ITU fiber standard G.652, enhanced backscatter fibers may increase backscatter signal strength as high as 100-fold. Such enhancements are accomplished by fiber inscription, or higher fiber core doping concentrations. If DAS 300 utilizes a pulsed system, pulse forming elements may be utilized to create high (on-off) extinction optical pulsing. This may be performed by semiconductor optical amplifiers (SOA) which are driven with electronic current pulses or Acoustic Optical Modulators (AOM) or fast optical switches which are driven with electrical voltage pulses. Additionally, launch optoelectronics 302 may comprise optical phase or frequency modulators which may be driven with electrical modulation signals which in turn are converted to optical modulation signals. These devices may be in-line or incorporated with splitters and recombiners to effectuate optical modulation functions which incorporate the interrogation strategy. Many designs also incorporate optical amplifiers which are usually Erbium. Further, directly prior to launch there may be optical splitters, and circulators which multiplex the outbound in backscatter light to their respective optical propagation paths.

In examples, launch optoelectronics 302 may operate and function to transmit one or more light pulses 308 into DAS 300. Within launch optoelectronics 302, one or more light pulses 308 may be modulated and/or pulsed by any combination of modulator and/or pulser. The modulators and/or pulsers may be arranged in-line or split into a parallel path, where optionally one of the legs in the parallel path has a fiber optic delay line, and the two paths are combined with a coupler to a single path, where third there is usually an optical amplifier, and fourth is a multiplex device. For single sensor systems, this is usually a circulator and/or a multi-element splitter where each split output is sent to a circulator. As illustrated, one or more light pulses 308 emitted from launch optoelectronics 302 may traverse to a circulator 310 by an optical fiber.

A circulator 310 functions to steer light unidirectionally between one or more input and outputs of circulator 310. Without limitation, circulators 310 are three-port devices wherein light from a first port is split internally into two independent polarization states and wherein these two polarization states are made to propagate two different paths inside circulator 310. These two independent paths allow one or both independent light beams to be rotated in polarization state via the Faraday effect in optical media. Polarization rotation of the light propagating through free space optical elements within the circulator thus allows the total optical power of the two independent beams to uniquely emerge together with the same phase relationship from a second port of circulator 310.

Conversely, if any light enters the second port of circulator 310 in the reverse direction, the internal free space optical elements within circulator 310 may operate identically on the reverse direction light to split it into two polarizations states. After appropriate rotation of polarization states, these reverse in direction polarized light beams, are recombined, as in the forward propagation case, and emerge uniquely from a third port of circulator 310 with the same phase relationship and optical power as they had before entering circulator 310. Additionally, as discussed below, circulator 310 may act as a gateway, which may only allow chosen wavelengths of light to pass through circulator 310 and pass to sensor fiber 312.

Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

FIGS. 4A-4D illustrate examples of different types of deployment of sensor fiber 312 in wellbore 102 (e.g., referring to FIGS. 1 and 2). As illustrated in FIG. 4, wellbore 102 deployed in formation 106 may include surface casing 400 in which production casing 402 may be deployed. Additionally, production tubing 404 may be deployed within production casing 402. In this example, sensor fiber 312 may be temporarily deployed in a wireline system in which a bottom hole gauge 408 is connected to the distal end of sensor fiber 312. Further illustrated, sensor fiber 312 may be coupled to a fiber connection 406. Without limitation, fiber connection 406 may attach sensor fiber 312 to circulator 310 (e.g., referring to FIG. 3). Fiber connection 406 may operate with an optical feedthrough system (itself comprising a series of wet- and dry-mate optical connectors) in the wellhead that optically couples sensor fiber 312 to circulator 310.

FIG. 4B illustrates an example of permanent deployment of sensor fiber 312. As illustrated in wellbore 102 deployed in formation 106 may include surface casing 400 in which production casing 402 may be deployed. Additionally, production tubing 404 may be deployed within production casing 402. In examples, sensor fiber 312 is attached to the outside of production tubing 404 by one or more cross-coupling protectors 410. Without limitation, cross-coupling protectors 410 may be evenly spaced and may be disposed on every other joint of production tubing 404. Further illustrated, sensor fiber 312 may be coupled to fiber connection 406 at one end and bottom hole gauge 408 at the opposite end.

FIG. 4C illustrates an example of permanent deployment of sensor fiber 312. As illustrated in wellbore 102 deployed in formation 106 may include surface casing 400 in which production casing 402 may be deployed. Additionally, production tubing 404 may be deployed within production casing 402. In examples, sensor fiber 312 is attached to the outside of production casing 402 by one or more cross-coupling protectors 410. Without limitation, cross-coupling protectors 410 may be evenly spaced and may be disposed on every other joint of production tubing 404. Further illustrated, sensor fiber 312 may be coupled to fiber connection 406 at one end and bottom hole gauge 408 at the opposite end.

FIG. 4D illustrates an example of a coiled tubing operation in which sensor fiber 312 may be deployed temporarily. As illustrated in FIG. 4D, wellbore 102 deployed in formation 106 may include surface casing 400 in which production casing 402 may be deployed. Additionally, coiled tubing 412 may be deployed within production casing 402. In this example, sensor fiber 312 may be temporarily deployed in a coiled tubing system in which a bottom hole gauge 408 is connected to the distal end of downhole fiber. Further illustrated, sensor fiber 312 may be attached to coiled tubing 412, which may move sensor fiber 312 through production casing 402. Further illustrated, sensor fiber 312 may be coupled to fiber connection 406 at one end and bottom hole gauge 408 at the opposite end.

Referring back to FIG. 3, during operations, sensor fiber 312 may be used to take measurements within wellbore 102. Sensor fiber 312 may comprise an optical fiber which naturally produces Rayleigh backscatter light based on its glass/waveguide characteristics over the entire length of the optical fiber. In other examples, the optical fiber may be enhanced to produce a controlled level of backscatter light to generally be larger than what is produced by the Rayleigh process by inscription of index of refraction perturbations. These perturbations may be continuous with even spacings along the entirety of the optical fiber, discontinuous skipping certain sections of the optical fiber, randomly distributed over the fiber, or organized to create Fiber Bragg Gratings FBG which may also be organized to be spaced continuously, or discontinuously, or random and configured to backscatter certain wavelength ranges, or certain multiple different wavelength ranges. Wavelength ranges may comprise optical wavelengths in the C band which may range from 1527 nm to 1570 nm. Additionally, in examples, wavelengths may also utilize about 1310 nm and about 1060 nm wavelengths. The distributed backscatter light within sensor fiber 312 reflects from all locations along the sensor fiber 312 and traverses up through sensor fiber 312 back to circulator 310. Circulator 310 may direct the backscatter light to return optoelectronics 304.

Return optoelectronics 304 may comprise one or more components that may create quadrature signals (either optical or electrical), or generally set up a PM or FM demodulation process and optical receivers. These can be either direct, single input type receivers or "balanced" (dual input) receivers. Additionally, return optoelectronics 304 may comprise one or more Wavelength Division Multiplexers (WDMs) may be used to combine all the wavelengths onto one optical fiber. If DAS 300 utilizes a pulsed system, pulse forming elements may be utilized to create high (on-off) extinction optical pulsing. This may be performed by semiconductor optical amplifiers (SOA) which are driven with electronic current pulses or Acoustic Optical Modulators (AOM) or fast optical switches which are driven with electrical voltage pulses. Additionally, return optoelectronics 304 may comprise optical phase or frequency modulators which may be driven with electrical modulation signals which in turn are converted to optical modulation signals. These devices may be in-line or incorporated with splitters and recombiners to effectuate optical modulation functions which incorporate an interrogation strategy. Many designs also incorporate optical amplifiers which are usually Erbium. Further, directly prior to launch there may be optical splitters, and circulators which multiplex the outbound in backscatter light to their respective optical propagation paths.

During operations, return optoelectronics 304 may operate and function to by taking backscatter light and passing it through an optical amplifier, optional, then passing the backscatter light through an optical compensation/modulation network (in line or split and recombined path), optionally breaking out waveforms with a WDM for demux which also includes quadrature setup, and finally passing the backscatter light or wavelengths of the backscatter light through optical receivers. This may allow for the backscatter light or wavelengths to be processed.

The output from return optoelectronics 304 may be transmitted to a digital acquisition (DAQ) and processing equipment 306. DAQ and processing equipment 306 may comprise multi-channel analog to digital converters, operating time synchronous and in parallel to receive outputs from return optoclectronics 304, convert the data to digital data streams, and communication protocol for transmitting a continuous data stream to a processing device, which are processed by information handling system 138. Information handling system 138 may process the data from Return optoelectronics 304 and perform one or more actions with the data to produce information that personnel may utilize to alter and/or change ongoing measurement operations.

Figure 5A:
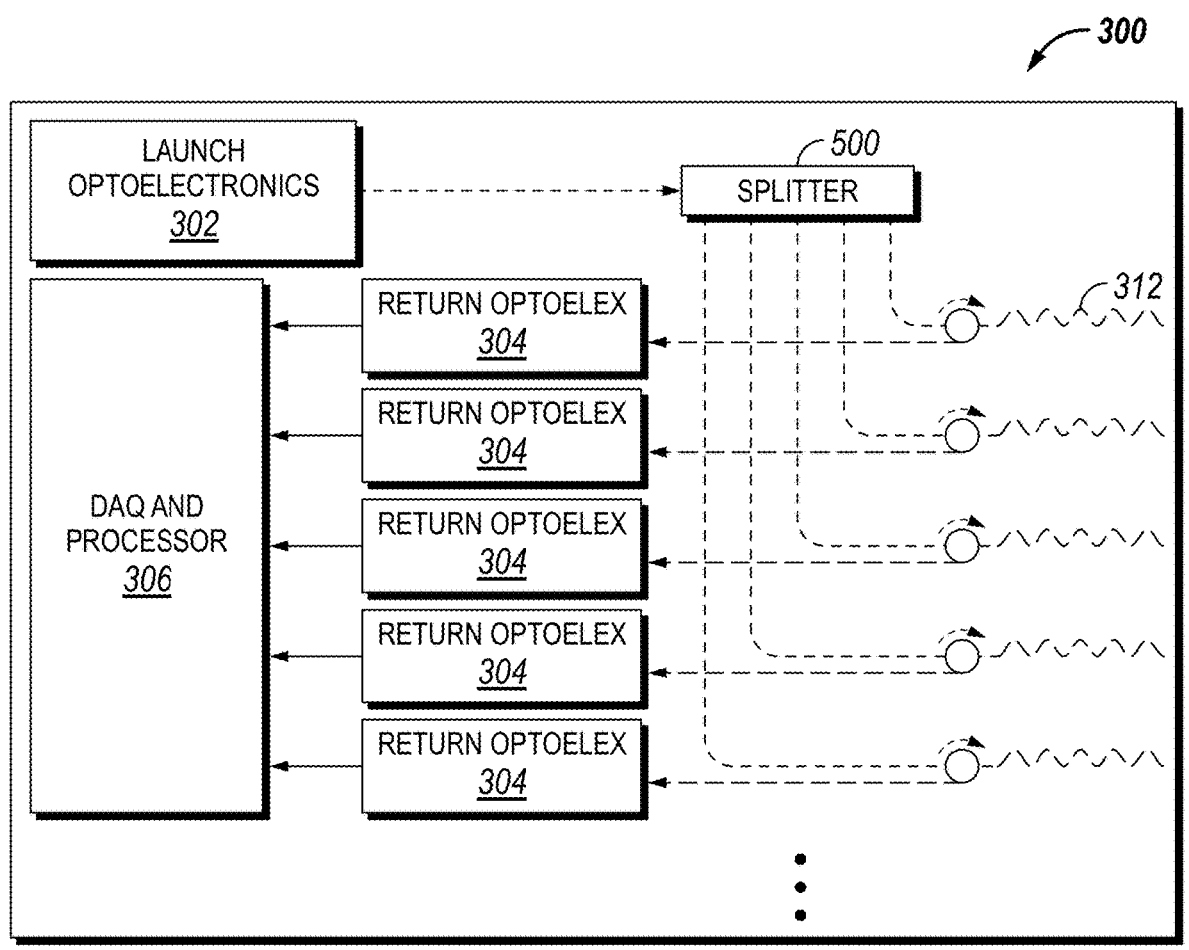
FIGS. 5A-5E illustrate the DAS with one or more reference coils for noise cancellation.

Figure 5A illustrates another example of DAS 300 in which a splitter 500 may be utilized. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310. Thus, each optical output from splitter 500 has its own circulator 310. This may allow for a single launch optoelectronics 302 to service a plurality of sensor fibers 312. As light pulses 308 pass through circulator 310 they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along sensor fiber 312 and traverse up through sensor fiber 312 to circulator 310. As there are multiple circulators 310, each circulator 310 may then direct the backscatter light to an individual return optoelectronics 304. In examples, not illustrated, each circulator 310 may be connected to a single return optoelectronics 304. Return optoelectronics 304 may operate and function as described above. The output from return optoelectronic 304 may be sent to DAQ and processor 306. DAQ and processor 306 may function and operate as described above. Information handling system 138 may process the receive the data from return optoelectronics 304 and perform one or more actions with the data to produce information that personnel may utilize to alter and/or change ongoing measurement operations.

Figure 5B:
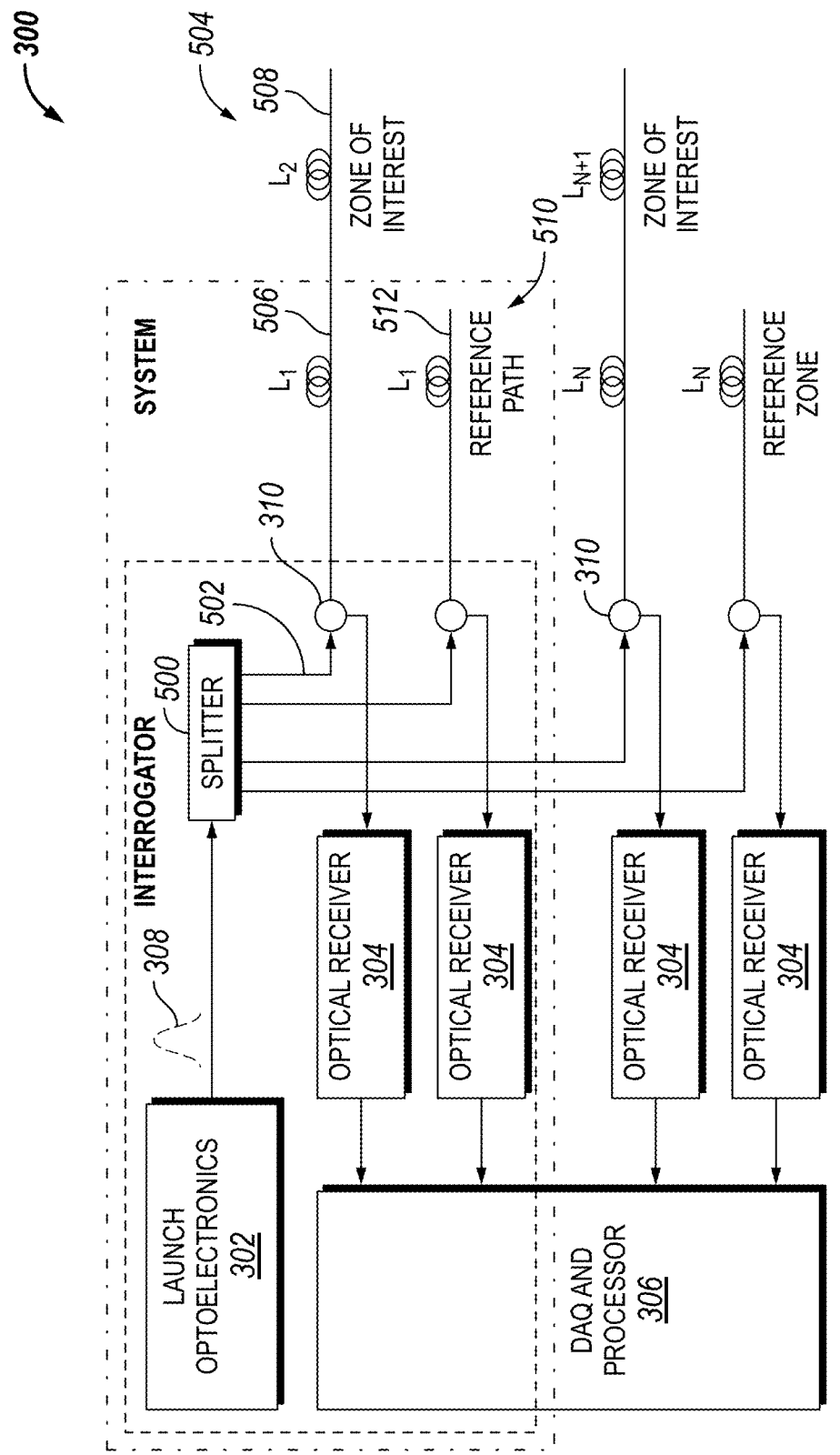

FIG. 5B illustrates another example of DAS 300 that may be utilized for noise cancellation during measurement operations. Thermal, mechanical and acoustic signals may impact optical interrogators and it may be beneficial to have a first system with a launch/receiver path monitoring a zone of interest complete circuit and a second system with a launch/receive path located at a substantially similar location as the system used for measuring the zone of interest and subtract any noise contribution measured with the second system from the first system. These measurements may be signals simultaneously measured on both optical receiver paths where the data is deviating from a baseline.

As illustrated, launch optoelectronics 302 may emit one or more light pulses 308 that may traverse to a circulator 310 by an optical fiber. Light pulses 308 may be formed for specific measurement operations. For example, a low frequency DAS strain measurement may be used for detecting various changes in flow conditions with signals below. Thus, light pulses may be 10 Hz or in some instances below 1 Hz or even below 0.1 Hz. Measurement operations for microseismic data may reside in the 10 Hz to 500 Hz and more particularly between 30 Hz to 100 Hz, whereas a VSP survey or a seismic survey may be optimized between 6 Hz to 150 Hz or more likely coordinated with the vibrational source frequency content of 10-100 Hz or in some instances higher frequency content when used with air gun sources. One launch optoelectronics 302 may be used to simultaneously measure broadband data for multiple applications simultaneously and the signal processing path may be different for the different applications and likewise the gain and SNR profile may be tailored to each different application. The time constant for a low frequency strain application targeting data below 1 Hz would be significantly different from a microseismic survey targeting data up to 500 Hz. As illustrated, light pulses 308 from launch optoelectronics 302 may traverse to splitter 500 by an optical fiber. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to circulator 310 (e.g., referring to FIG. 3). Thus, each optical output from splitter 500 has its own circulator 310. This may allow for a single launch optoelectronics 302 to service a plurality of sensor fibers 312. For example, in one instance at least one of the light pulses 308 to traverse to a wellbore of interest 504 in which a sensor fiber 312 may be disposed. Within wellbore of interest 504, sensor fiber 312 may be divided into at least two sections. In examples, a first section 506 may be a first length of $L_1$ in wellbore of interest 504 and a second length of $L_2$ in a second section of sensor fiber 312 identified as a zone of interest 508. First section 506 may be a length from relief coil 530 to zone of interest 508. Zone of interest 508 is a length with the wellbore of interest 504 in which measurements may be performed. Zone of interest 508 may be identified and defined by personnel during measurement operations. Backscatter light may reflect off all locations along first section 506 and/or zone of interest 508 and traverse back through first section 506 and/or zone of interest 508 to circulator 310.

Additionally, each wellbore of interest 504 has a reference wellbore 510. Reference wellbore 510 may receive one or more light pulses 308 from splitter 500 through a circulator 310. As with wellbore of interest 504, a sensor fiber 312 may be disposed within reference wellbore 510. Sensor fiber 312 may have a reference path 512 of a first length of $L_1$. Reference path 512 may be nearly identical in nature to first section 506 of wellbore of interest 504. Specifically, it is the length of optical fiber from reference coil 532 to the end of the optical fiber. Reference path 512 and first section 506 may be about the same length in different but close wellbores such that both may experience common environmental (unrelated to signals chosen to be sensed) perturbations/noise. If so, workflow 534, discussed below, may be implemented by subtracting environmental noise from reference path 512 using first section 506, so that signals from zone of interest 508 may be represented after such processing. Backscatter light may reflect off all locations along reference path 512 and traverse back through reference path 512 to circulator 310. As illustrated, there may be any number of wellbores of interest 504 with a reference wellbore 510 that may be serviced by splitter 500 within DAS system 300.

Each circulator 310 may then guide backscatter light to optical receiver 606. Optical receiver 606 may operate and function as described above. The output from optical receiver 606 may be sent to DAQ and processor 306. DAQ and processor 306 may function and operate as described above. Information handling system 138 may process the receive the data from return optoelectronics 304 and perform one or more actions with the data to measurements within an optical fiber that are thermally/mechanically/acoustically isolated from the environment.

Figure 5C:
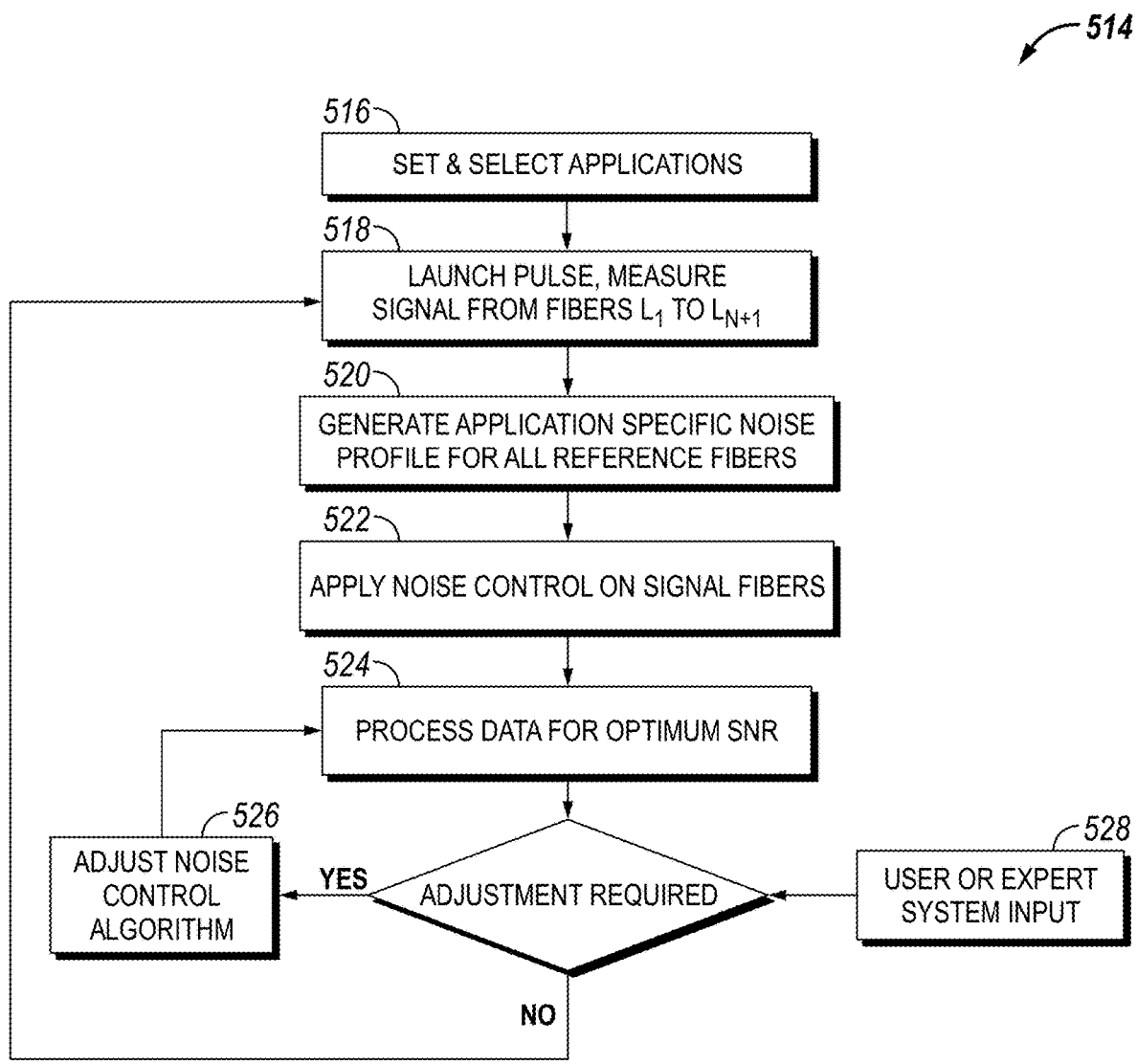

FIG. 5C illustrates workflow 514 for isolating measurements within DAS 300 from thermal, mechanical, and/or acoustic signals that may add error into the measurements. In examples, at least a part of workflow 514 may be performed on or controlled by information handling system 138. Workflow 514 may begin with block 516 in which an application is selected. For example, there may be operations in which an active swept signal may be utilized for seismic measuring, fracture monitoring, strain sensing, or flow monitoring. Each operation may have different frequencies and signal magnitudes of interest. Thus, each operation may need different noise cancellation constructs/algorithms (e.g., in block 520, 522, and 524 as well) to be effective.

In block 518, launch optoelectronics 302 may launch one or more light pulses 308 into DAS 300. As discussed above, one or more light pulses 308 may enter into wellbore of interest 504. Specifically, within wellbore of interest 504, the one or more light pulses 308 may traverse through first section 506 and/or zone of interest 508. Backscatter light may reflect off all locations along first section 506 and/or zone of interest 508 and traverse back through first section 506 and/or zone of interest 508 to circulator 310. Backscatter light from first section 506 and/or zone of interest 508 may be measured.

In block 520, an application specific noise profile may be generated for all reference fibers. To generate the specific noise profile, launch optoelectronics 302 may launch one or more light pulses 308 into DAS 300. As discussed above, one or more light pulses 308 may enter into reference path 512 of reference wellbore 510. Backscatter light may reflect off all locations along reference path 512 and traverse back through reference path 512 to circulator 310. Backscatter light from reference path 512 may be measured. This measurement may be the specific noise profile.

Reference path 512 may be used for active noise cancellation where the data from the reference path may be subtracted from optical signals in the measured path for the signals of interest or the data from the reference path may be used to actively control laser sources to mitigate the effect measured from the reference path. The reference path may include acoustic, vibrational and thermal effects in the DAS system enclosure or the DAS system rack or the DAS deployment environment (trailer, instrument room etc.), or it may include signal paths in a close proximity of a fracturing spread, or it may include signal paths in close proximity of various fracturing spread components like pumps, blenders, valves, missiles or other commonly used fracturing equipment. The reference path data may be used to monitor equipment noise, vibrational noise from fracturing equipment that may generate tube waves in a wellbore through mechanical surface waves that may then impact subsurface measurements, noise radiation patterns of equipment and noise sources that may be measured as a function of noise emissions vs. orientation of equipment, noise radiation patterns as a function of fracturing spread operations over a set of operating parameters and operating conditions e.g. type of pumps (diesel, natural gas, electrical etc.), pump loading vs. pressure, flow rates, proppant concentration, chemicals like e.g. friction reducers etc., distance to DAS systems, supply operations of trucks moving sand, chemicals, fluids etc. that may generate detrimental noise. The reference path data may be characterized across applications vs. frequency as signal attenuation vs. frequency varies depending on signal path between the source and receiver. The data measured in the signal path may be used to actively mitigate the noise impact from the various noise sources at a given location, and it may also be used to actively re-orient, re-locate or control operating parameters and operating conditions of associated equipment generating noise. It may be desirable to operate a fracturing equipment like pumps and blenders at different conditions or across operating parameters where the system noise contribution is reduced or replace equipment that generate excessive noise across the given application space. Reference path 512 may be positioned to detect direction and characteristics of noise sources in order to identify and mitigate specific noise sources within a fracturing spread. Control actions and mitigations may then be taken in response to the measured reference path data in order to generate sufficient data quality for a given application.

Data measured in the reference path may be used to identify fault conditions in the frac spread equipment or abnormal characteristics of a piece of equipment where the data may be used to alarm, alert or otherwise notice a supervisory control system of an existing fault condition or a potential future fault condition in order proactively mitigate a future potential equipment condition. The data can be used to plan for optimized equipment use where repair and maintenance operations can be planned and executed in order to avoid disruptions to operations with associated downtime.

In block 522 noise control may be applied to measurements from sensor fiber 312 that may be disposed in wellbore of interest 504 or other suitable locations. In examples, noise control may be applied by taking raw signals from zone of interest 508 and reference wellbore 510 and perform perfunctory interferometric demodulation and "operate" on them by scaling a noise profile from block 520 and subtracting, or convolving or cross correlating, or whatever best works to "purify" the signal types of interest (application) and reject all other "environmental" noise. Options also include identifying, classifying, quantifying and mitigate noise sources within the operating environment and taking appropriate noise mitigation actions through processing and/or noise source mitigation.

In block 524, data may be processed to optimize the signal to noise ratio (SNR) after applying noise control in block 522. For example, noise control applied in block 522 may leave some residual obvious artifacts which may be diminished and/or removed utilizing filtering in block 524. Residual noise and artifacts may be quantified in terms of noise sources, frequency ranges, operating conditions, processed results and appropriate mitigations in terms of removing noise sources or operating noise sources away from resonance peaks or other harmful operating points may be taken to remove remaining noise artifacts.

Noise sources signatures and noise source characteristics may identify as time series data that may be converted to amplitude and phase over frequency vs. operating conditions, and the noise source attributes may be stored and used with various algorithms including but not limited to computer algorithms, machine learning, neural networks, artificial intelligence, natural language models or similar. Source signatures may then be mitigated using suitable software algorithms or mitigations of said noise sources. Mitigations may include removal or exchange of noise sources, operating noise sources at different operating points, re-orienting noise sources based on characteristics, changing supply operation schedules to mitigate noise impact to operations or other actions as identified based on noise source characteristics and operational requirements. Mitigations may be application specific based on noise source characteristics or sensing system requirements as dictated by operation and application specific requirements.

If adjustment is needed for optimization, in block 526 (which is a loop), noise control algorithm may be adjusted by a user or expert system input in block 528. In examples, block 526 may be utilized like a servo. For example, if noise cancelation isn't perfect and off by some level of percent selected by personnel, in block 524, a "pick-off" (error) signal may be determined and fed back into the system to improve noise cancellation. This is something akin to how a phase locked loop works. Additionally, in block 528, an application specific control modifier may be utilized that regulates the parameters for the control loop in block 526. For example, active feedback electronic filters, such as open loop bandwidth and damping coefficients (loosely). If no adjustment is needed, then workflow 514 may be repeated for another wellbore or zone of interest.

Figure 5D:
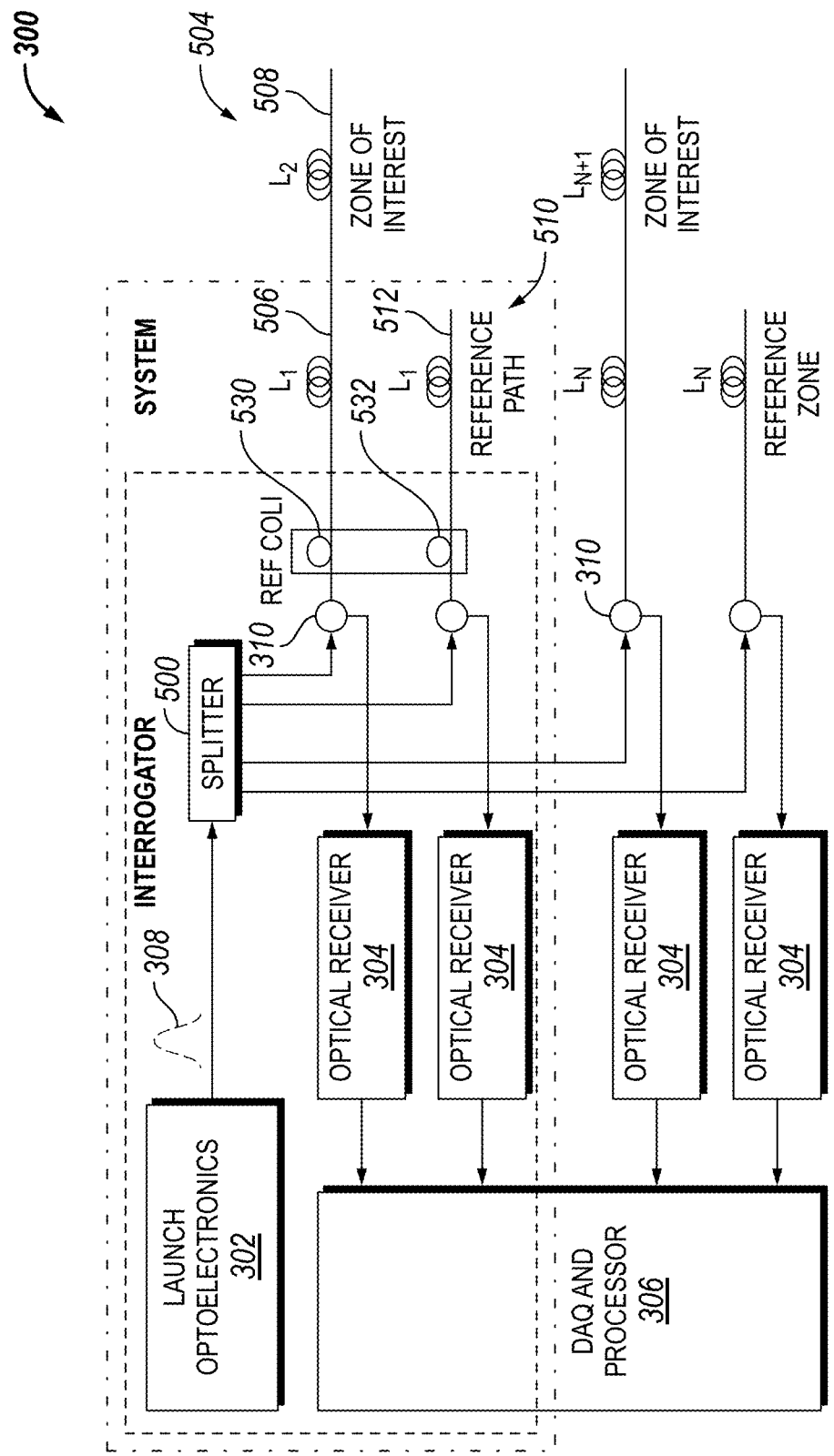

FIG. 5D illustrates another example of DAS 300 that may be utilized for noise cancellation during measurement operations. Thermal, mechanical and acoustic signals may impact optical interrogators and it may be beneficial to have a first system with a launch/receiver path monitoring a zone of interest complete circuit and a second system with a launch/receive path located at a substantially similar location as the system used for measuring the zone of interest and subtract any noise contribution measured with the second system from the first system. These measurements may be signals simultaneously measured on both optical receiver paths where the data is deviating from a baseline.

As illustrated, launch optoelectronics 302 may emit one or more light pulses 308 that may traverse to a circulator 310 by an optical fiber. Light pulses 308 may be formed for specific measurement operations. For example, a low frequency DAS strain measurement may be used for detecting various changes in flow conditions with signals below. Thus, light pulses may be 10 Hz or in some instances below 1 Hz or even below 0.1 Hz. Measurement operations for microseismic data may reside in the 10 Hz to 500 Hz and more particularly between 30 Hz to 100 Hz, whereas a VSP survey or a seismic survey may be optimized between 6 Hz to 150 Hz or more likely coordinated with the vibrational source frequency content of 10-100 Hz or in some instances higher frequency content when used with air gun sources. One launch optoelectronics 302 may be used to simultaneously measure broadband data for multiple applications simultaneously and the signal processing path may be different for the different applications and likewise the gain and SNR profile may be tailored to each different application. The time constant for a low frequency strain application targeting data below 1 Hz would be significantly different from a microseismic survey targeting data up to 500 Hz. As illustrated, light pulses 308 from launch optoelectronics 302 may traverse to splitter 500 by an optical fiber. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310 (e.g., referring to FIG. 3). Thus, each optical output from splitter 500 has its own circulator 310. In this example, light pulses 308 traversing from circulator 310 may travers through a reference coil fiber 530 before traversing to wellbore of interest 504. Reference coil fiber 530 may be wrapped around mandrel of a material with high thermal conductivity/high thermal mass where the mandrel may be suspended using a spring or similar material such that the mass-spring system may be designed to attenuate signals in frequency band of interest, and where this mass-spring system is placed in an enclosure where the air may be evacuated towards a vacuum. This may reduce thermal and acoustic conductivity enhancing the environmental isolation from environmental disturbances. Suitable sensors, sensor coils or reference measurement devices may be placed at suitable places around a location where a system is deployed in order to enable system and application specific noise mitigation.

Similarly, reference coil fiber 530 located between the optical interrogator and the zone of interest may be exposed to thermal, mechanical and/or acoustic signals that may imprint onto the data from zone of interest 508 so it may be desirable to subtract these signatures using a measurement from a reference path. A second reference coil fiber 532 in reference wellbore 510 may be placed in substantially the same location as reference coil fiber 530 in wellbore of interest 504.

The noise characteristics of launch optoelectronics 302 may be different from the noise characteristics of reference coil fiber 530 between launch optoelectronics 302 and zone of interest 508, which is why it may be necessary to have multiple noise measurements that may be individually applied for noise suppression.

As noted above, light pulses 308 may traverse through reference coil fiber 530 into wellbore of interest 504. Within wellbore of interest 504, sensor fiber 312 may be divided into at least two sections. In examples, a first section 506 may be a first length of $L_1$ in wellbore of interest 504 and a second length of $L_2$ in a second section of sensor fiber 312 identified as a zone of interest 508. Zone of interest 508 is a length with the wellbore of interest 504 in which measurements may be performed. Zone of interest 508 may be identified and defined by personnel during measurement operations. Backscatter light may reflect off all locations along first section 506 and/or zone of interest 508 and traverse back through first section 506 and/or zone of interest 508 to circulator 310.

Additionally, each wellbore of interest 504 has a reference wellbore 510. Reference wellbore 510 may receive one or more light pulses 308 from splitter 500 through a circulator 310. As with wellbore of interest 504, a sensor fiber 312 may be disposed within reference wellbore 510. Sensor fiber 312 may have a reference path 512 of a first length of $L_1$. Reference path 512 may be nearly identical in nature to first section 506 of wellbore of interest 504. Reference path 512 and first section 506 may be about the same length in different but close wellbores such that both may experience common environmental (unrelated to signals chosen to be sensed) perturbations/noise. If so, workflow 534, discussed below, may be implemented by subtracting environmental noise from reference path 512 using first section 506, so that signals from zone of interest 508 may be represented after such processing. Backscatter light may reflect off all locations along reference path 512 and traverse back through reference path 512 to circulator 310. In this example, with coils However with reference coil fibers 530 and 532 added DAS 300 may have the ability to modify the interrogation pulses for each of the sensor fibers 312 which may enhance or detune signals. As illustrated, there may be any number of wellbores of interest 504 with a reference wellbore 510 that may be serviced by splitter 500 within DAS system 300.

Each circulator 310 may then guide backscatter light to optical receiver 606. Optical receiver 606 may operate and function as described above. The output from optical receiver 606 may be sent to DAQ and processor 306. DAQ and processor 306 may function and operate as described above. Information handling system 138 may process the receive the data from return optoelectronics 304 and perform one or more actions with the data to measurements within an optical fiber that are thermally/mechanically/acoustically isolated from the environment.

Figure 5E:
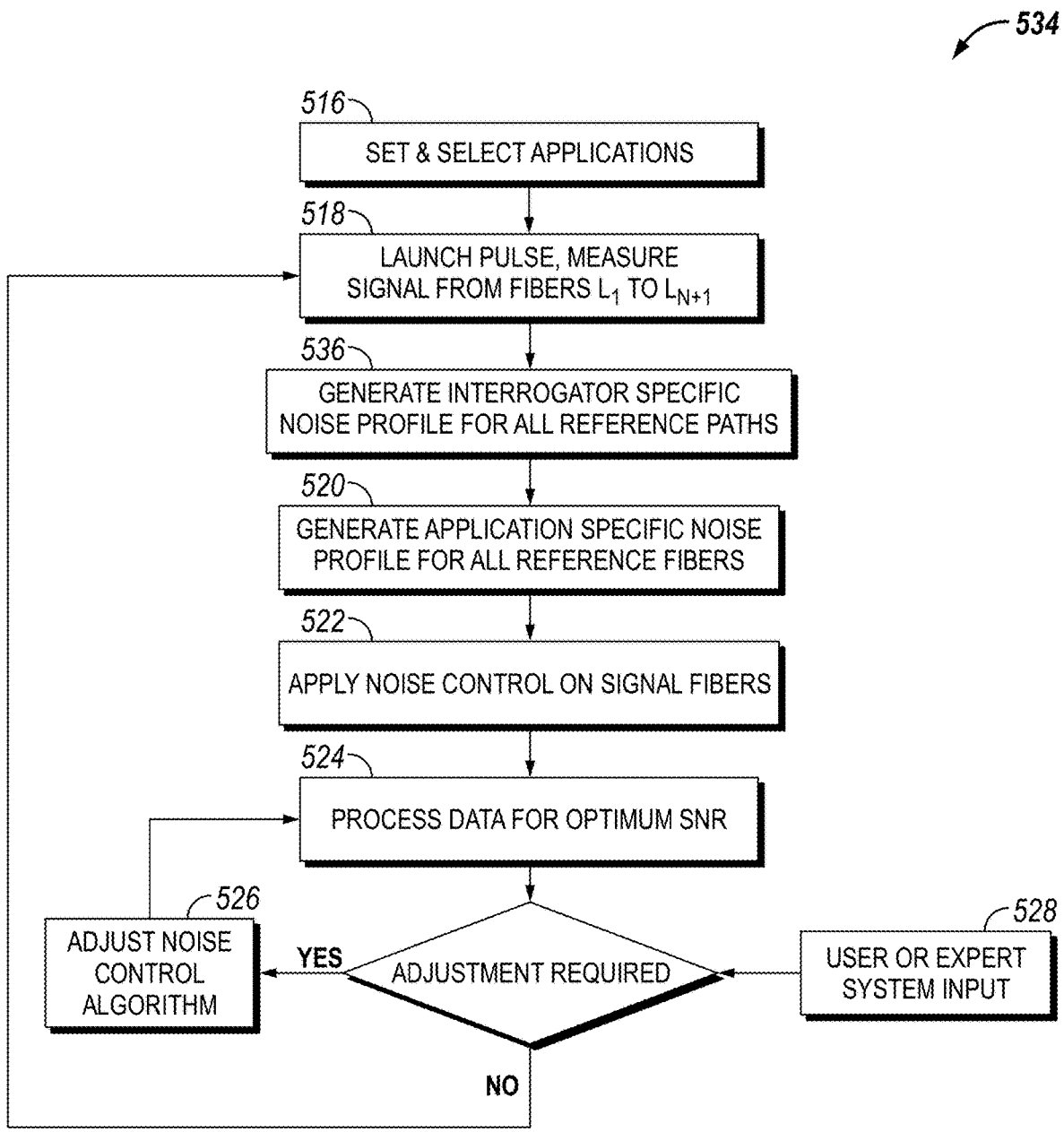

FIG. 5E illustrates a workflow 534 for isolating measurements within DAS 300 from thermal, mechanical, and/or acoustic signals that may add error into the measurements. In examples, at least a part of workflow 534 may be performed on or controlled by information handling system 138. Workflow 534 may begin with block 516 in which an application is selected. For example, there may be operations in which an active swept signal may be utilized for seismic measuring, fracture monitoring, strain sensing, or flow monitoring. Each operation may have different frequencies and signal magnitudes of interest. Thus, each operation may need different noise cancellation constructs/algorithms (e.g., in block 520, 522, and 524 as well) to be effective.

In block 518, launch optoelectronics 302 may launch one or more light pulses 308 into DAS 300. As discussed above, one or more light pulses 308 may enter into wellbore of interest 504. Specifically, within wellbore of interest 504, the one or more light pulses 308 may traverse through first section 506 and/or zone of interest 508. Backscatter light may reflect off all locations along first section 506 and/or zone of interest 508 and traverse back through first section 506 and/or zone of interest 508 to circulator 310. Backscatter light from first section 506 and/or zone of interest 508 may be measured.

In block 536, an interrogator specific noise profile is generated for all reference paths 512. This may be performed as described above. In block 520, an application specific noise profile may be generated for all reference fibers and at selected sensing fiber locations. To generate the specific noise profile, launch optoelectronics 302 may launch one or more light pulses 308 into DAS 300. As discussed above, one or more light pulses 308 may enter into reference path 512 of reference wellbore 510 or suitable locations where reference path fiber 512 is located. Backscatter light may reflect off all locations along reference path 512 and traverse back through reference path 512 to circulator 310. Backscatter light from various locations along reference path 512 may be measured and processed based on applications. These measurements may be specific noise profiles.

In block 522 noise control may be applied to measurements from sensor fiber 312 that may be disposed in wellbore of interest 504. In examples, noise control may be applied by as described above. After applying noise control in block 524, data may be processed to optimize the signal to noise ratio (SNR). Optimization may be performed by characterization of noise sources by frequency bands (amplitude, phase frequency) vs. operational aspects. Sensing applications may have signal bands of interest where it would be beneficial to minimize noise contributions during the time while the application specific data acquisition is performed. The noise source contribution may be subtracted or otherwise removed through appropriate processing, or the noise source contribution may be suppressed by operating the noise source in a different condition. The ability to control noise sources like e.g., pumps and blenders allows a system approach where controllable noise sources can be controlled, and attributes can be recorded. The input control parameters and recorded noise characteristics can be used to actively used to mitigate noise impact on measurement systems, measurement data and associated operations.

If adjustment is needed for optimization, in block 526 noise control algorithm may be adjusted by a user or expert system input in block 528. If no adjustment is needed, then workflow 534 may be repeated for another wellbore of interest. Adjustments may key off noise characteristics. Specifically, noise characteristics may be induced i.e., excessive noise by system components like e.g., improper laser power, improper amplifier settings improper optical receiver settings. Once identified suitable calibration routines can be applied to optimize component and system settings to reduce noise. External noise sources can be identified and appropriately mitigated as described in sections as described above. Remaining noise sources may be mitigated using software algorithms where noise contributions may be subtracted or otherwise removed through appropriate processing.

Figure 6:
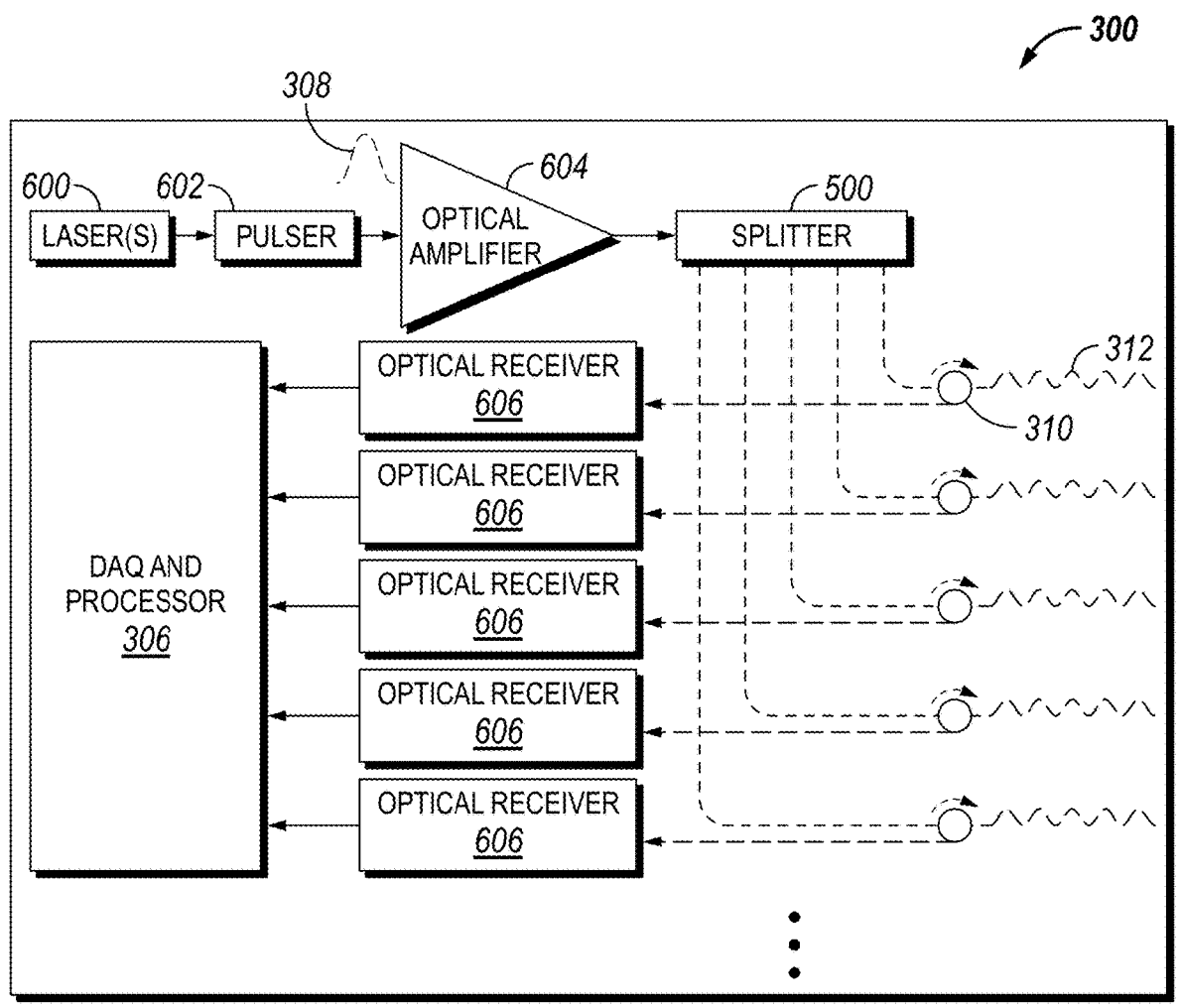

FIG. 6 illustrates another example of DAS 300 in which a laser 600 may produce a continuous wave (CW) laser light, that may traverse through DAS 300. The CW laser light (fiber pigtail) may traverse from laser 600 to pulser 602 through an optical fiber to pulser 602. Pulser 602 may receive the CW laser light as input and implements a high-speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to an optical amplifier 604 by another optical fiber.

Optical amplifier 604 is an active device which creates optical gain. In examples, optical amplifier 604 may receive light pulses as inputs (fiber pigtailed) and create an optical amplified output. Optical amplifiers 604 may be an Erbium Doped Fiber Amplifiers (EDFA) or Semiconductor Optical Amplifiers (SOA). The output from optical amplifier 604 may traverse to splitter 500. Splitter 500 may operate and function as described above. As illustrated, there may be any number of optical outputs from splitter 500.

Each of the optical outputs may be connected by an optical fiber 502 to a circulator 310. Thus, each optical output from splitter 500 has its own circulator 310. This may allow for a single launch optoelectronics 302 to service a plurality of sensor fibers 312. As light pulses 308 pass through circulator 310 they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. Ad there are multiple circulators 310, each circulator 310 may then direct the backscatter light to an individual return optoelectronics 304. In examples, not illustrated, each circulator 310 may be connected to an optical receiver 606. Optical Receivers 606 may comprise a fiber coupled input to a reverse biased PIN photodiode to convert incident light to electrical current and integrated to an electronic conversion circuit. A PIN photodiode is a semiconductor design, where there is a P-doped region and a N-doped region which is separated by an intrinsic undoped I region separating the P and N regions. This type of design may allow for increased photodetection and is known for it by using the acronym PIN. The electronic conversion circuit may allow for the production of voltages and also amplify the voltages suitable to voltage levels compatible with digital acquisition. Bandwidths for these devices may range from 20 MHz to 11 GHz.

The output from optical receivers 606 may be sent to DAQ and processor 306. DAQ and processor 306 may function and operate as described above. Information handling system 138 may process the receive the data from optical receivers 606 and perform one or more actions with the data to produce information that personnel may utilize to alter and/or change ongoing measurement operations.

Figure 7:
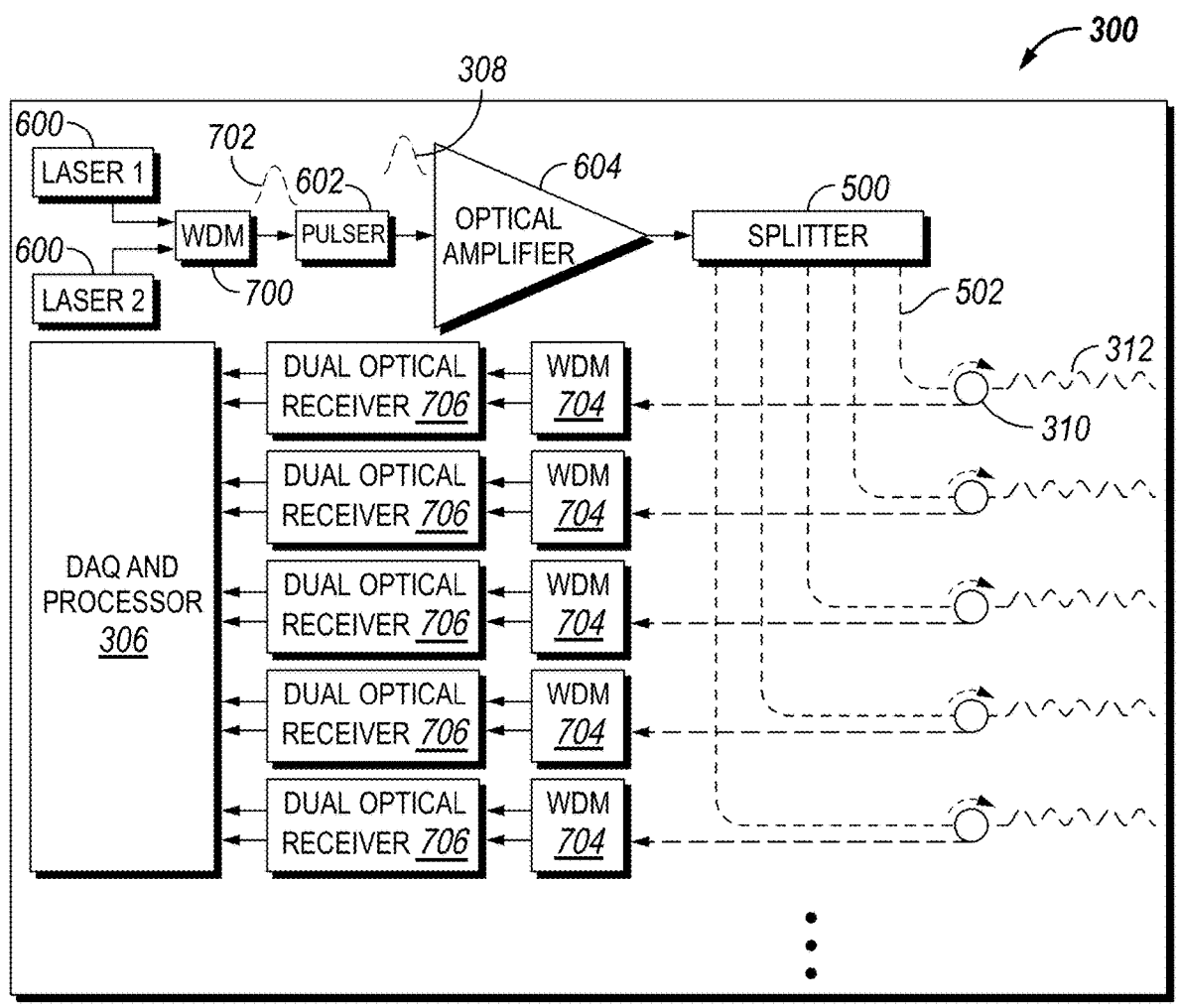

FIG. 7 illustrates another example of DAS 300. As illustrated, two or more lasers 600 may each originate a single linewidth, high stability, continuous wave devices with high coherence, where light exits through a fiber optic pigtail. The light pulse from each laser 600 may traverse to a wavelength division multiplexer (WDM) 700. WDM 700 may be used to optically combine or separate individual wavelengths into a single combined light 702 or one or more separate single combined light wavelengths. Single combined light 702 may move from WDM 700 to pulser 602 through another optical fiber. Pulser 602 is a device that may receive singe combined light 702 and/or a CW laser light (fiber pigtail) as input and implements a high speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to an optical amplifier 604 by another optical fiber.

The output from optical amplifier 604 may traverse to splitter 500. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310. Thus, each optical output from splitter 500 has its own circulator 310. This may allow for one or more lasers 600 to service a plurality of sensor fibers 312. As light pulses 308 pass through circulator 310 they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. As there are multiple circulators 310, each circulator 310 may then direct the backscatter light to a receiving WDM 704. In examples, not illustrated, each circulator 310 may be connected to a single receiving WDM 704. A receiving WDM 704, the backscatter light may be broken out into different wavelengths that originated from each laser 600. Individual wavelengths separated by WDM 704 may traverse to a dual optical receiver 706 by an optical fiber. For each figure utilizing dual optical receiver 706, such as FIG. 7, it should be noted that dual optical receiver 706 is a simplified block that represents two individual optical receivers 606. Each optical receiver 606 of dual optical receiver 706 may handle a specific wavelength input.

The output from dual optical receiver 706 may be sent to DAQ and processor 306. DAQ and processor 306 may function and operate as described above. Information handling system 138 may process the receive the data from return optoelectronics 304 and perform one or more actions with the data to produce information that personnel may utilize to alter and/or change ongoing measurement operations.

FIG. 8 illustrates another example of DAS 300. In this example DAS 300 may be phase sensitive by utilizing a launch delay to form a dual pulse heterodyne. As illustrated, a laser 600 or a plurality of lasers 600 may be utilized. Laser 600 may be a single linewidth, high stability, continuous wave devices with high coherence, where light exits through a fiber optic pigtail. The CW light from laser 600 may traverse to pulser 602 through an optical fiber. Pulser 602 is a device that may receive the CW laser light (fiber pigtail) as input and implements a high speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to coupler 800. A coupler 800 may be a traditional fused type fiber optic splitter, a circulator, a PLC fiber optic splitter, fiber coupler, and/or any other type of splitter known to those with ordinary skill in the art. As illustrated, coupler 800 may split the light pulse into a first light pulse that traverses through a first optical fiber 802 and a second light pulse that traverses through a second optical fiber 804. Further, first optical fiber 802 may comprise an acousto-optic modulator (AOM) 806, used both for optical frequency shifting and on/off switching to create frequency shifted optical pulses. In second optical fiber 804, a delay 808 may be added. A delay 808 may be aa length of optical fiber which may be coiled. This optical fiber provides for an approximate time delay of 5 ns per meter. In examples, delay 808 may operate and function to establish a time delay between the two pulses caused by the splitter/recombiner which may implement a gauge length. The first light pulse and the second light pulse may then be combined at second coupler 814. Second coupler 814 may operate and function as coupler 800 but combine the light pulses from first optical fiber 802 and second optical fiber 804 into a combined light 702. Combined light 702 from second coupler 814 may traverse to an optical amplifier 604 by another optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. After passing through optical amplifier 604, the backscatter light may traverse to optical receiver 606. Optical receiver 606 may comprise a fiber coupled input to a reverse biased PIN photodiode to convert incident light to electrical current and integrated to an electronic conversion circuit to produce voltages and also amplify the voltages suitable to voltage levels compatible with digital acquisition. Bandwidths for these devices can be as high as 1 GHz.

The output from optical receivers 606 may be sent to quadrature downconverter 812 through an optical fiber. It should be noted that the frequency of the backscatter light is the same frequency as the light pulses from AOM 806. Quadrature downconverter 812 may comprise dual RF downconverters referenced from the frequency to each drive an AOM, one at 0 degrees phase offset and the other at 90 degrees phase offset, and result with output baseband signals which are in quadrature, denoted as I and Q electrical signals. In examples, quadrature downconverter 812 may operate and function to prepare proper inputs for PM demodulation by information handling system 138. Output from quadrature downconverter 812 may be two quadrature outputs of I and Q, which may be inputs to DAQ and processor 306. It should be noted, for a coherent reference, which is a light pulse 308 formed from a continuation wave (CW) laser, quadrature downconverter 812 may be replaced by an optical four quadrant hybrid detector. This is due to the coherent reference being an optical homodyne down conversion process instead of an electronic down conversion. DAQ and processor 306 may function and operate as described above Information handling system 138 may process the receive the data from return optoelectronics 304 and perform one or more actions with the data to produce information that personnel may utilize to alter and/or change ongoing measurement operations.

FIG. 9 illustrates another example of DAS 300. In this example DAS 300 may be phase sensitive by utilizing a receiver delay to form a single pulse homodyne. As illustrated, a laser 600 or a plurality of lasers 600 may be utilized.

Laser 600 may be a single linewidth, high stability, continuous wave devices with high coherence, where light exits through a fiber optic pigtail. The CW light from laser 600 may traverse to pulser 602 through an optical fiber. Pulser 602 is a device that may receive the CW laser light (fiber pigtail) as input and implements a high speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to optical amplifier 604 through an optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. The backscatter light from optical amplifier 604 may traverse to coupler 800. Coupler 800 may split the light pulse into a first light pulse that traverses through a first optical fiber 802 and a second light pulse that traverses through a second optical fiber 804. The second light pulse may encounter a delay 808 in the second optical fiber 804. The first light pulse and the second light pulse may then be inputs into passive optical quadrature 900. Passive optical quadrature 900 is a passive optical device, sometimes known as a "hybrid" which is specifically tuned for the optical wavelength in use to accept two inputs which are two legs of an interferometer and create two or four quadrature optical outputs. In examples, passive optical quadrature 900 may operate and function to appropriately represent an optical intensity quadrature signal which may be optically received, digitized and PM demodulated in information handling system 138. The first light pulse and second light pulse, after traversing through passive optical quadrature 900 may each traverse to an optical receiver 606.

Optical receiver 606 may comprise a fiber coupled input to a reverse biased PIN photodiode to convert incident light to electrical current and integrated to an electronic conversion circuit to produce voltages and also amplify the voltages suitable to voltage levels compatible with digital acquisition. Bandwidths for these devices can be as high as 1 GHz.

The output from optical receivers 606 may be an I or Q, which may be inputs to DAQ and processor 306. DAQ and processor 306 may function and operate as described above Information handling system 138 may process the receive the data from return optoelectronics 304 and perform one or more actions with the data to produce information that personnel may utilize to alter and/or change ongoing measurement operations.

Figure 10:
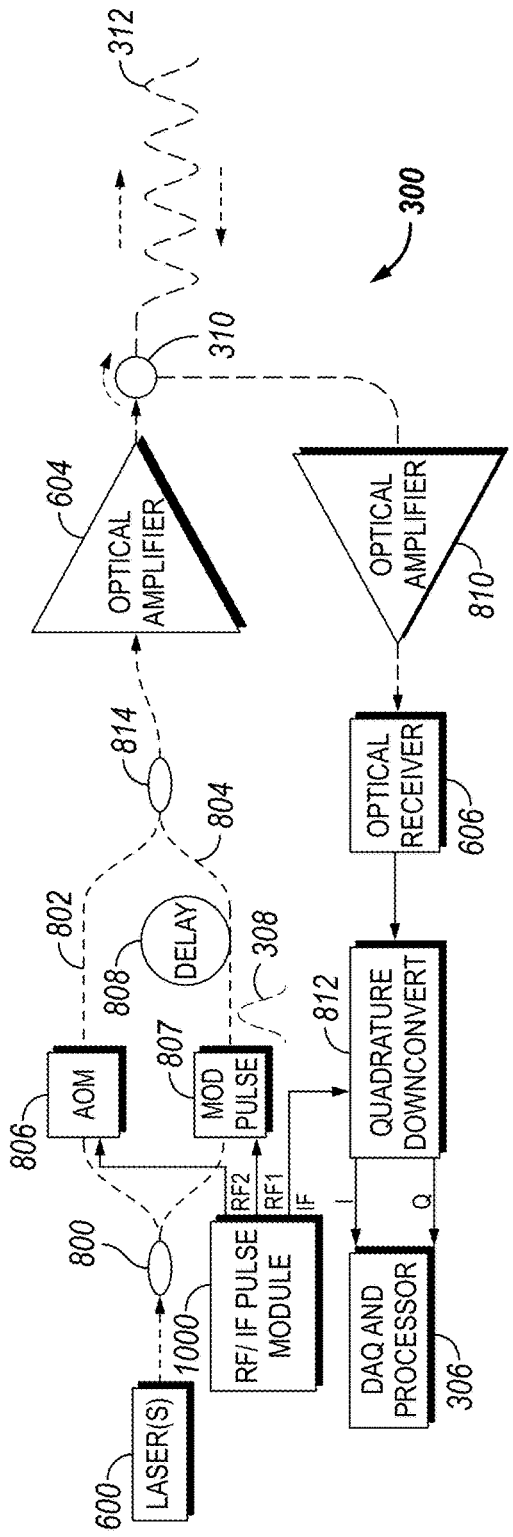

FIG. 10 illustrates another example of DAS 300. In this example DAS 300 may be phase sensitive by utilizing a launch delay to form a dual pulse RF/IF heterodyne. As illustrated, a laser 600 or a plurality of lasers 600 may originate one or more single linewidth, high stability, CW light with high coherence, where the CW light exits from laser 600 and may traverse through DAS 300. The CW light from laser 600 or lasers 600 may traverse to coupler 800. Coupler 800 may split the light pulse into a first light pulse that traverses through a first optical fiber 802 and a second light pulse that traverse through a second optical fiber 804. Further, first optical fiber 802 may comprise an acousto-optic modulator (AOM) 806, used both for optical frequency shifting and on/off switching to create frequency shifted optical pulses. In second optical fiber 804, a modulator (MOD) pulser and a delay 808 may be added. MOD pulse 807 is an intensity modulated or frequency modulated or combined intensity and frequency modulated pulse. In examples, MOD pulse 807 may utilize an input of the CW light form laser 600 and create optical frequency shifting and on/off switching to create frequency shifted optical pulses, which is referred to as a light pulse 308 for this disclosure. MOD pulser 807 may be at least partially controlled by RF/IF pulse module 1000. The output from MOD pulse 807 may be a light pulse 308. As illustrated, an RF/IF pulse module 1000 may be connected to first AOM 806 and MOD pulse 807. RF/IF pulse module 1000 may comprise an electronic signal generator to emit two RF frequencies RF1 and RF2 and appropriate switching to drive AOMs 806 or MOD pulser 807 to create pulsed frequency shifted optical outputs. It also generates a CW difference (Intermediate) Frequency (IF) which is RF1-RF2 which is used as a reference to the receive optoelectronics quadrature downconverter 812. The first light pulse and the second light pulse may then be combined at second coupler 814. The combined light pulse from second coupler 814 may traverse to an optical amplifier 604 by another optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. After passing through optical amplifier 604, the backscatter light may traverse to optical receiver 606. Optical receiver 606 may comprise a fiber coupled input to a reverse biased PIN photodiode to convert incident light to electrical current and integrated to an electronic conversion circuit to produce voltages and also amplify the voltages suitable to voltage levels compatible with digital acquisition. Bandwidths for these devices can be as high as 1 GHz.

The output from optical receivers 606 may be sent to quadrature downconverter 812 through an optical fiber. As illustrated, quadrature downconverter 812 may be connected to RF/IF pulse module 1000. In examples, RF/IF pulse module 1000 may also generate a CW difference (Intermediate) Frequency (IF) which is RF1-RF2 which is used as a reference to the receive optoelectronics quadrature downconverter 812. Output from downconverter 812 may be data as I and Q, which may be inputs to DAQ and processor 306. DAQ and processor 306 may function and operate as described above Information handling system 138 may process the receive the data from return optoelectronics 304 and perform one or more actions with the data to produce information that personnel may utilize to alter and/or change ongoing measurement operations.

Figure 11:
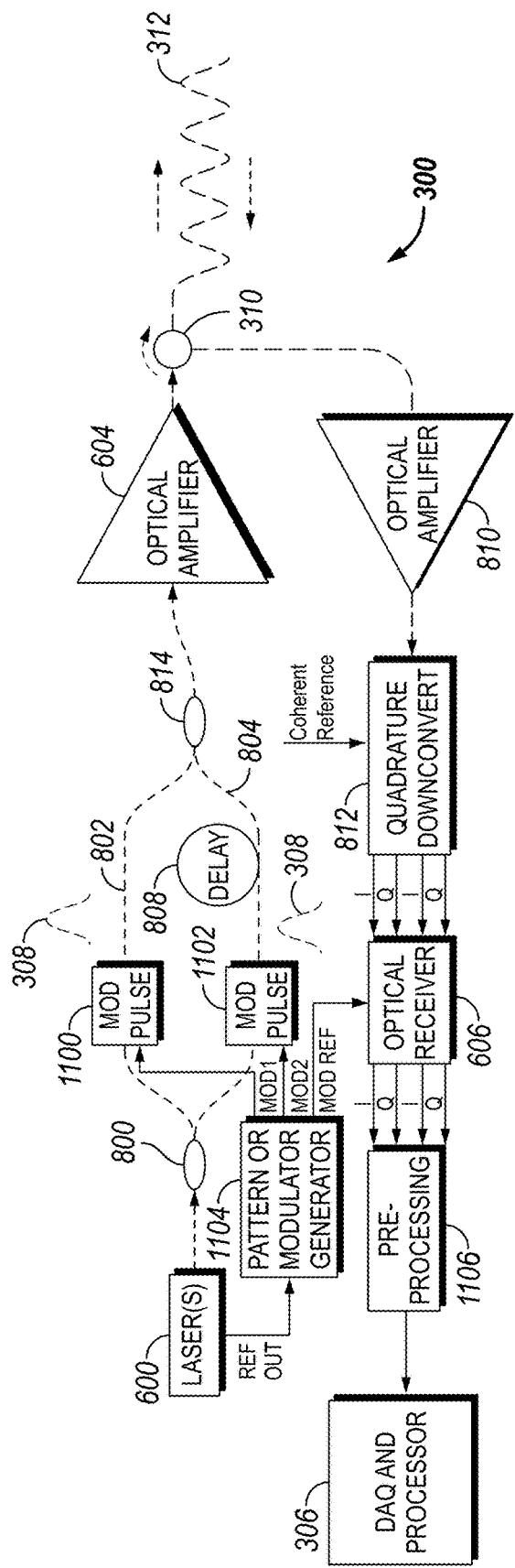

FIG. 11 illustrates another example of DAS 300. In this example DAS 300 may be phase sensitive by utilizing a launch delay to form a pulsed coherent reference. As illustrated, a laser 600 or a plurality of lasers 600 may originate one or more single linewidth, high stability, CW light with high coherence, where the CW light exits from laser 600 and may traverse through DAS 300. The CW light from laser 600 may traverse to coupler 800. Coupler 800 may split the light pulse into a first light pulse that traverses through a first optical fiber 802 and a second light pulse that traverse through a second optical fiber 804. Further, first optical fiber 802 may comprise a MOD pulse 1100. MOD pulse 1100 is an intensity modulated or frequency modulated or combined intensity and frequency modulated pulse. In examples, MOD pulse 1100 may be used both for optical frequency shifting and on/off switching to create frequency shifted optical pulses. The output from MOD pulse 1100 may be a light pulse 308. In examples, MOD pulse 807 may utilize an input of the CW light form laser 600 and create optical frequency shifting and on/off switching to create frequency shifted optical pulses, which is referred to as a light pulse 308 for this disclosure. MOD pulser 807 may be at least partially controlled by pattern or modulation generator 1104. The output from MOD pulse 807 may be a light pulse 308 In second optical fiber 804, a second MOD pulse 1102, which may also output a light pulse 308, and a delay 808 may be added. As illustrated, pattern or modulation generation 1104 may be connected to first MOD pulse 1100 and second MOD pulse 1102. Pattern or modulation generation 1104 may comprise arbitrary signal generators that create amplitude modulation to define a pulse shape. In examples, pattern or modulation generation 1104 may operate and function to enable matched receiver filtering to enhance signal to noise interrogation performance. The combined light pulse from second coupler 814 may traverse to an optical amplifier 604 by another optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. After passing through second optical amplifier 810, the backscatter light may traverse to quadrature downconverter 812 through an optical fiber. Output from downconverter 812 may be data as I and Q, which may be inputs to optical receiver 606. As illustrated, optical receivers 606 may be connected to pattern or modulation generator 1104. In examples, pattern or modulation generator 1104 may create an amplitude modulated mask that enables matched filtering. The output from optical receivers 606 may be sent to pre-processing 1106. The output from pre-processing 1106 may be input to DAQ and processor 306. The optical preprocessing function combines the coherent reference with the light returning from the sensor fiber 312 using a coupler and presents it to the optical receiver where the two signals interfere with a baseband signal. In examples, pre-processing may comprise fixed operational functions such as filtering, numeric conversions, stacking, normalizing, and/or the like. Generally, this may comprise combining the coherent reference with the light returning from the sensor fiber 312 using a coupler and presents it to the optical receiver where the two signals interfere to a baseband signal. DAQ and processor 306 may function and operate as described above Information handling system 138 may process the receive the data from return optoelectronics 304 and perform one or more actions with the data to produce information that personnel may utilize to alter and/or change ongoing measurement operations.

Figure 12:
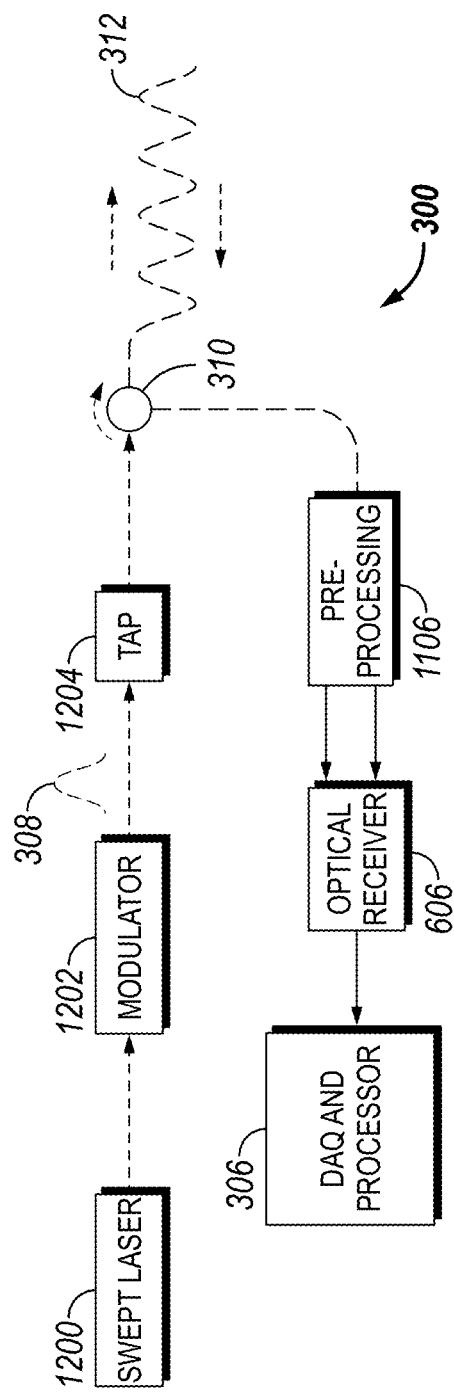

FIG. 12 illustrates another example of DAS 300. In this example DAS 300 may be phase sensitive by utilizing a CW swept laser to form a pulsed coherent reference. As illustrated, a swept laser 1200 may originate one or more originate one or more single linewidth, high stability, CW light with high coherence, where the CW light exits from laser 600 and may traverse through DAS 300. In examples, swept laser 1200 may be a laser with direct or external cavity modulation via mechanical means or a laser with optical index of modulation. The output from swept laser 1200 may be a single laser or plurality of laser that produces multiple frequencies for different light pulses. These CW light may pass to modulator 1202 through an optical fiber.

Modulator 1202 may be an in-line device which may create both optical phase and optical intensity modulation which is provided an electrical input for the modulation. In examples, modulator 1202 may operate and function in conjunction with swept laser 1200 to create a precise repeatable optical wavelength sweep over a programmable wavelength range, which may be referred to as light pulse 308. The output from modulator 1202, light pulse 308, may traverse to tap 1204. Tap 1204 may comprise a passive fiber optic optical tap coupler which typically allots a small percentage (<5%) of the light for detection and processing). In examples, tap 1204 may operate and function to permit examination optical intensity of the laser sweep within pre-processing unit 1106 to create correction signals to 1202 modulator drive. The output from tap 1204 may connect to a circulator 310 through an optical fiber.

As light pulses 308 pass through circulator 310 they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. Circulator 310 may guide the backscatter light to pre-processing 1106. As illustrated, swept laser 1200 and tap 1204 may be connected to pre-processing 1106. This may allow for examination optical intensity of the laser sweep within pre-processing 1106 to create correction signals to 1202 modulator drive. The output from pre-processing 1106 may be transmitted to an optical receiver 606 by an optical fiber.

The output from optical receiver 606 may be sent to DAQ and processor 306. DAQ and processor 306 may function and operate as described above Information handling system 138 may process the receive the data from return optoelectronics 304 and perform one or more actions with the data to produce information that personnel may utilize to alter and/or change ongoing measurement operations.

Figure 13:
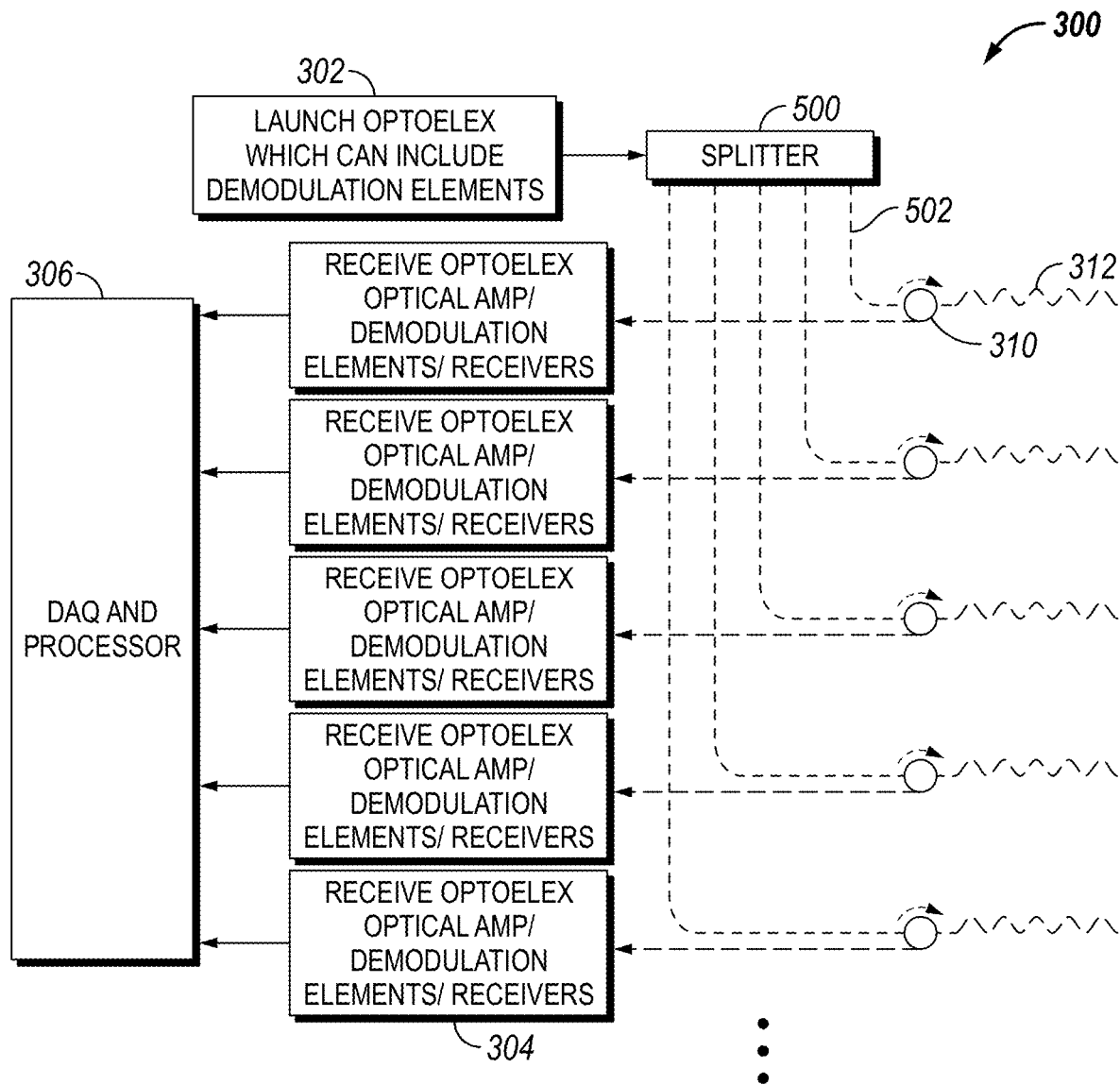

FIG. 13 illustrates another example of DAS 300 in which a launch optoelectronics 302 originates one or more light pulses 308 to a splitter 500. In examples, optoelectronics 302 may include a demodulation element. A demodulation element may comprise optical elements such as hybrid quadrature devices or after optical reception, electronic circuitry which enable quadrature signal creation. Further, demodulation element may operate and function to create baseband electrical quadrature signals which may be digitized and demodulated within DAQ and processor 306. The light pulse output may traverse to splitter 500 through an optical fiber. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310. Thus, each optical output from splitter 500 has its own circulator 310. This may allow for a single launch optoelectronics 302 to service a plurality of sensor fibers 312. As light pulses 308 pass through circulator 310 they may enter sensor fiber 312. Sensor fiber 312 may be disposed at least partially within a wellbore 102. It should further be noted that circulator 310 may be disposed on surface 108 or within wellbore 102. Sensor fiber 312 may be permanently deployed in a wellbore 102 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. Ad there are multiple circulators 310, each circulator 310 may then direct the backscatter light to an individual return optoelectronics 304. In examples, not illustrated, each circulator 310 may be connected to a single return optoelectronics 304. Return optoelectronics 304 may operate and function as described above. Additionally, in this example, return optoelectronics 304 may comprise all components discussed above regarding return optoelectronics 304, as well as an optical amplifier (AMP), demodulation elements, and/or an optical receiver 606. The output from return optoelectronic 304 may be sent to DAQ and processor 306. DAQ and processor 306 may function and operate as described above Information handling system 138 may process the receive the data from return optoelectronics 304 and perform one or more actions with the data to produce information that personnel may utilize to alter and/or change ongoing measurement operations.

DAS system 300 is also applicable in other applications not specific to oil and gas measurements or the oil and gas industry. DAS system 300 is also applicable in applications of human endeavors in which technology is utilized to better human life. For example, there are many systems in place, in cities, that use technology to improve human life. In these "future cities" DAS system 300 may be utilized in a common local to control a large number of systems and sensors.

One such system that may utilize DAS system 300 is security infrastructures that are physical or electronic. For example, sensor fiber 312 may be integrated into a fiber optic telecommunication network. This integration may be created by dark fibers reserved for future sensing applications. In this disclosure, dark fibers are fibers within an optical fiber cable that have not been or are not currently being used. Within the fiber optic telecommunication network may be controls for power, water sewage, gas line, and/or the like. DAS system 300 may be able to sense third party intrusion within the telecommunication network by acoustic emissions or vibrations from digging or trenching, or drilling equipment. Other types of physical infrastructures that may utilize DAS system 300 are perimeter and border security systems, bridges, dams, and/or other large structures. In these applications, sensor fiber 312 may be integrated into these physical infrastructures by direct fiber mounting or embedding into structures, or fences, or burial along the perimeter. Another physical infrastructure may be road in which DAS system 300 may be used to create "smart roads." These smart roads may utilize sensor fiber 312 for traffic monitoring, congestion detection and speed control, and road conditions. In these applications, sensor fibers 312 may be integrated into a smart road by embedded into the road itself during construction or post construction trenched during striping processes or incorporated into medians or road skirts. This may allow for sensor fibers 312 to measure and control measured vibration signals are processed and characterized for event types of interest as well as determination and status/alarm levels in real time Vehicle speed, weight, tire count, detection and location of emergency vehicles through active acoustics.

Outside of smart roads, railways may utilize DAS system 300 to determine traffic conditions, rock falls, wheel cracks, and/or train tracking. In these examples, sensor fibers 312 may be integrated into railways by being buried under or aside the track bed thus sensitive to dynamic vibrations. This may allow for sensor fibers 312 to measure and control measured vibration signals are processed and characterized for event types described as well as determination and status/alarm levels in real time.

Physical structures such as power systems may utilize DAS system 300 for cable monitoring, transmission line vibration, and/or substation monitoring. In these examples, sensor fibers 312 may be integrated into these power systems by power lines manufactured with fiber placed within the hollow core of the power cable. As these fibers are integral to the power cable, they are sensitive to both strain and vibrations. Substation monitoring involves embedment of the fibers or ground burial of the fibers in close proximity to the pads and the substation equipment. Sensor fibers 312 may measure and control measured vibration signals are processed and characterized for event types described as well as determination and status/alarm levels in real time.

Geophysical implementation of DAS system 300 may be used to track land subsidence (risk locations) as well as monitoring for earthquakes and land seismicity. In these applications DAS system 300 may be integrated through sensor fiber 312 by burial of the fiber. Sensor fibers 312 may then measure and control Measured vibration signals are processed and characterized for event types described as well as determination and status/alarm levels in real time.

The architecture described above for DAS system 300 implements a single launch system to feed two or more sensors (i.e., sensor fibers). Current technology does not teach a single launch system that can handle two or more sensors. Additionally, the architecture reduces the cost for DAS systems 300 as it reduced hardware for DAS utilization.

The method and systems described above are an improvement over current technology. Current technology DAS systems architectures implement one or two sensors per system and are cost prohibitive for most applications requiring massive volume sensing coverage. The innovation of a DAS system architecture which implements a single DAS interrogator with a large sensor count fan-out (10's of sensors) addresses the needed cost efficiency (cost per unit length of sensing) for such volume sensing applications.

Improvements include a method, system and process to characterize noise sources across an application specific environment in order to control noise source contributions to final results and identify variables related to noise characteristics in order to achieve application specific objectives like e.g., improved signal to noise with reduced system cost using a multi-channel DAS system.

Improvements include means to identify, classify, quantify and reduce noise source impact from internal and external noise sources within a multichannel DAS based sensing system. The system when implemented in a stand-alone environmentally isolated enclosure will be exposed to less environmental noise (thermal, mechanical, acoustic) and the multi-channel approach with multiple sensing channels will enable measurements and identification of internal system noises as well as external noise sources in a cost-effective manner. Internal noise sources may be mitigated through system calibration, external noise sources may be identified and mitigated through various means including removal, re-location and use of different operational set points as applicable to operations and remaining noise source contributions may be mitigated through appropriate processing. Various applications can then be optimized based on application specific requirements as noise sources characteristics vary over frequency, signal sources and sensing events have specific frequency content and sensing applications have specific frequency bands of interest.

Improvements include an enhanced operational environment with a stand-alone enclosure using a thermally, vibrationally and acoustically stable environment where external factors like people induced effects like walking, opening doors, vibrations, thermal variations due to opening doors etc. are removed. The stand-alone enclosure and system include a thermally and vibrationally isolated enclosure where the systems are located in a temperature-controlled enclosure.

The systems and methods for a DAS system discussed above, may be implemented to allow for the utilization of two or more sensors from a single source and may comprise any of the various features of the systems and methods disclosed herein, including one or more of the following statements.

Statement 1: A distributed acoustic system (DAS) may comprise at least one laser that that transmits at least one light pulse, a splitter optically connected to the at least one laser to optically split the at least one light pulse into a plurality of light pulses, wherein each of the plurality of light pulses is an output of the splitter, a circulator optically connected to an output of the splitter, a sensor fiber attached to the circulator, wherein the sensor fiber is divided into a first section and a zone of interest, and a reference coil disposed on the sensor fiber between the circulator and the first section.

Statement 2: The DAS of statement 1, further comprising a first optical receiver optically connected to the circulator.

Statement 3: The DAS of statements 1 or 2, wherein the sensor fiber is disposed in a wellbore of interest.

Statement 4: The DAS of any previous statements 1-3, further comprising a second circulator optically connected to a second output of the splitter.

Statement 5: The DAS of statement 4, further comprising a second sensor fiber attached to the second circulator.

Statement 6: The DAS of statement 5, wherein the second sensor fiber is disposed in a reference wellbore.

Statement 7: The DAS of statement 5, wherein the second sensor fiber is identified as a reference path.

Statement 8: The DAS of statement 7, further comprising a second reference coil disposed on the second sensor fiber between the second circulator and the reference path.

Statement 9: The DAS of statement 8, further comprising a first optical receiver optically connected to the circulator.

Statement 10: The DAS of statement 9, further comprising a second optical receiver optically connected to the second circulator.

Statement 11: A method may comprise transmitting one or more light pulses from a laser into a distributed acoustic system (DAS), wherein the DAS is at least partially disposed in a wellbore of interest and a reference wellbore, generating an interrogator specific noise profile for the reference wellbore, generating an application specific noise profile for a first sensor fiber disposed in the reference wellbore, applying a noise control to measurements of a backscatter light from a second sensor fiber disposed in the wellbore of interest, and optimizing a signal to noise ratio (SNR) of the measurements from the backscatter light.

Statement 12: The method of statement 11, wherein the second sensor fiber is divided into a first section and a zone of interest.

Statement 13: The method of statement 12, wherein a reference coil is disposed on the second sensor fiber between a circulator and the first section.

Statement 14: The method of statements 11 or 12, wherein a reference coil is disposed on the first sensor fiber between a circulator and a reference path.

Statement 15: The method of any previous statements 11, 12, or 14, further comprising adjusting a noise control algorithm of the DAS.

Statement 16: The method of statement 15, wherein the noise control algorithm is a machine learning, a neural networks, an artificial intelligence, or a natural language models.

Statement 17: The method of statement 16, wherein a feedback electronics filter, an open loop bandwidth, or a damping coefficients are used for the adjusting the noise control algorithm.

Statement 18: The method of statement 17 wherein residual noise and artifacts are removed using the noise control algorithm.

Statement 19. The method of statement 15, wherein the adjusting the noise control algorithm is performed by personnel.

Statement 20: The method of statement 19, wherein the personnel remove one or more error signals within the noise control algorithm.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   transmitting one or more light pulses from a launch optoelectronics into a distributed acoustic system (DAS), wherein the DAS is at least partially disposed in a wellbore of interest and a reference wellbore;
   generating an interrogator specific noise profile for the reference wellbore;
   generating an application specific noise profile for a first sensor fiber disposed in the reference wellbore;
   applying a noise control to measurements of a backscatter light from a second sensor fiber disposed in the wellbore of interest; and
   optimizing a signal to noise ratio (SNR) of the measurements from the backscatter light.

2. The method of claim 1, wherein the second sensor fiber is divided into a first section and a zone of interest.

3. The method of claim 2, wherein a reference coil is disposed on the second sensor fiber between a circulator and the first section.

4. The method of claim 1, wherein a reference coil is disposed on the first sensor fiber between a circulator and a reference path.

5. The method of claim 1, further comprising adjusting a noise control algorithm of the DAS.

6. The method of claim 5, wherein the noise control algorithm is a machine learning, a neural networks, an artificial intelligence, or a natural language models.

7. The method of claim 6, wherein a feedback electronics filter, an open loop bandwidth, or a damping coefficients are used for the adjusting the noise control algorithm.

8. The method of claim 7, wherein residual noise and artifacts are removed using the noise control algorithm.

9. The method of claim 5, wherein the adjusting the noise control algorithm is performed by personnel.

10. The method of claim 9, wherein the personnel remove one or more error signals within the noise control algorithm.

\* \* \* \* \*